(12) United States Patent
Qian

(10) Patent No.: US 12,198,373 B2
(45) Date of Patent: Jan. 14, 2025

(54) SCENARIO TRIGGERING AND INTERACTION BASED ON TARGET POSITIONING AND IDENTIFICATION

(71) Applicant: HANGZHOU TARO POSITIONING TECHNOLOGY CO., LTD., Hangzhou (CN)

(72) Inventor: Hao Qian, Hangzhou (CN)

(73) Assignee: HANGZHOU TARO POSITIONING TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/549,836

(22) PCT Filed: Mar. 7, 2022

(86) PCT No.: PCT/CN2022/079497
§ 371 (c)(1),
(2) Date: Sep. 8, 2023

(87) PCT Pub. No.: WO2022/188733
PCT Pub. Date: Sep. 15, 2022

(65) Prior Publication Data
US 2024/0169582 A1    May 23, 2024

Related U.S. Application Data
(60) Provisional application No. 63/158,231, filed on Mar. 8, 2021.

(51) Int. Cl.
*G06T 7/73*    (2017.01)
*G06F 3/01*    (2006.01)
(Continued)

(52) U.S. Cl.
CPC ............... *G06T 7/73* (2017.01); *G06F 3/011* (2013.01); *G06F 3/017* (2013.01); *G06F 3/0346* (2013.01);
(Continued)

(58) Field of Classification Search
CPC ............ G06T 7/73; G06T 2207/10016; G06T 2207/30196; G06T 2207/30244;
(Continued)

(56) References Cited

U.S. PATENT DOCUMENTS

2015/0326832 A1* 11/2015 Zhang .................... H04N 23/61
                                                          348/159
2020/0154036 A1*  5/2020 Qian ...................... H04N 23/10
(Continued)

FOREIGN PATENT DOCUMENTS

CN    103115613 A    5/2013
CN    103543827 A    1/2014
(Continued)

OTHER PUBLICATIONS

International Search Report issued in International application No. PCT/CN2022/079497 dated May 30, 2022 (5 pages).
(Continued)

*Primary Examiner* — Tom V Sheng
(74) *Attorney, Agent, or Firm* — Osha Bergman Watanabe & Burton LLP

(57) ABSTRACT

A method for scenario triggering and interaction is disclosed. One or more camera devices (110) are used to monitor a target object (142) in a scene (140). A target object vector (143a) is generated from captured images of each camera device (110) to represent a line of sight from the camera device (110) to the target object (142). A target object position (129) in the scene (140) is then determined from an intersection of the target object vectors (143a). The
(Continued)

target object position (129) is compared with a task triggering region (144) in the scene (140) to trigger a pre-determined task when the target object (142) is within or around the task triggering region (144). For example, the target object (142) may be a human user and augmented reality contents are presented to the human user when the human user is detected to be within or around the task triggering region (144).

20 Claims, 21 Drawing Sheets

(51) Int. Cl.
G06F 3/0346 (2013.01)
H04N 23/61 (2023.01)

(52) U.S. Cl.
CPC .............. *G06T 2207/10016* (2013.01); *G06T 2207/30196* (2013.01); *G06T 2207/30244* (2013.01); *H04N 23/61* (2023.01)

(58) Field of Classification Search
CPC ........ G06F 3/011; G06F 3/017; G06F 3/0346; H04N 23/61
USPC ........................................................ 345/156
See application file for complete search history.

(56) References Cited

U.S. PATENT DOCUMENTS

| 2021/0142634 | A1* | 5/2021 | Li | G06T 7/292 |
| 2022/0084214 | A1* | 3/2022 | Qian | G06T 7/246 |
| 2022/0086482 | A1* | 3/2022 | Qian | H04N 19/55 |
| 2022/0104959 | A1* | 4/2022 | Beavers | G06F 3/013 |
| 2022/0343610 | A1* | 10/2022 | Heitger | G06T 19/006 |
| 2023/0316566 | A1* | 10/2023 | Li | G06T 7/246 |
| | | | | 382/103 |

FOREIGN PATENT DOCUMENTS

| CN | 105807931 A | 7/2016 |
| CN | 106251404 A | 12/2016 |
| CN | 112288815 A | 1/2021 |
| CN | 112313576 A | 2/2021 |
| WO | 2013076478 A1 | 5/2013 |

OTHER PUBLICATIONS

Written Opinion issued in International application No. PCT/CN2022/079497 dated May 30, 2022 (4 pages).

* cited by examiner

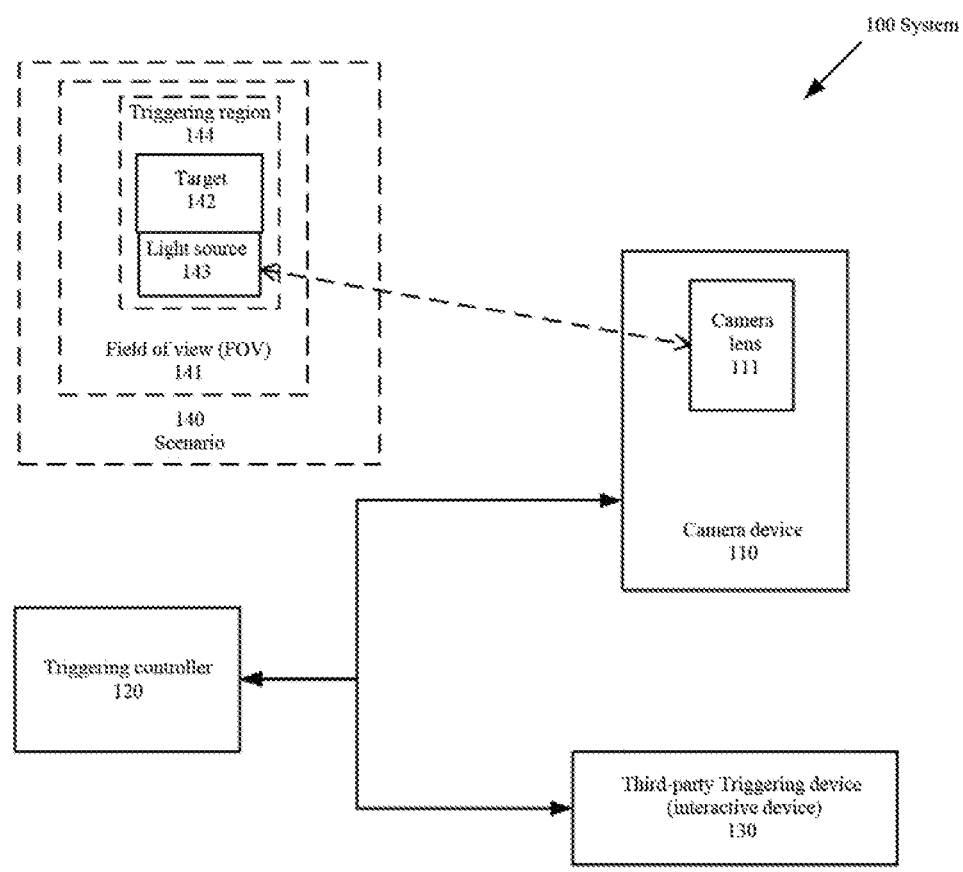
FIG. 1.1

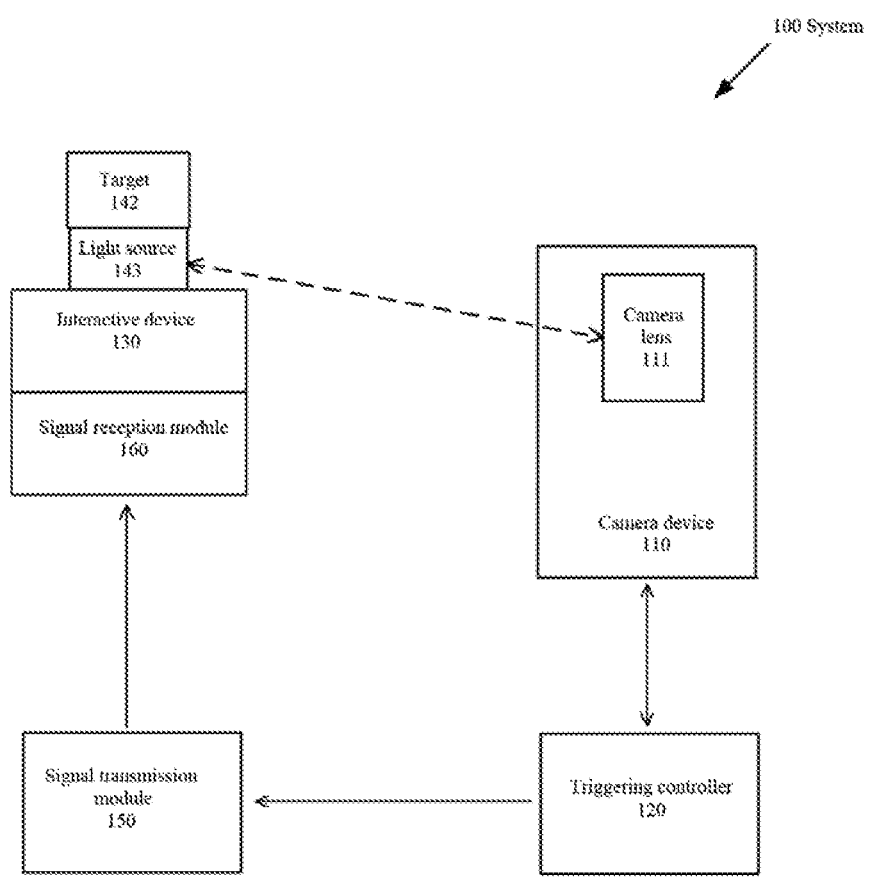
FIG. 1.2

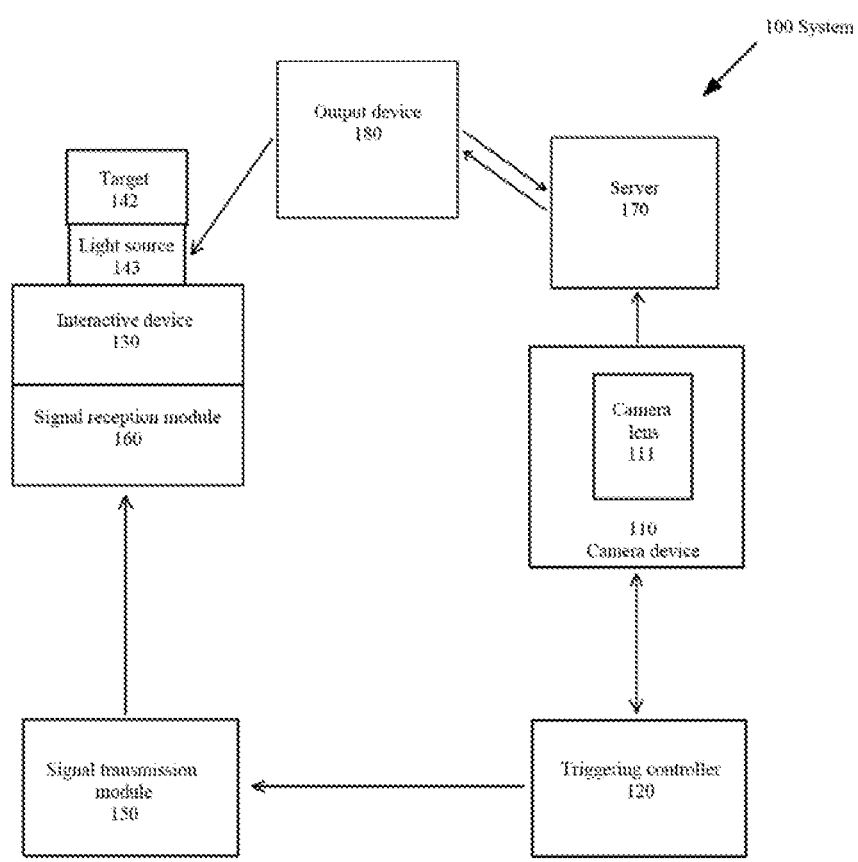
FIG. 1.3

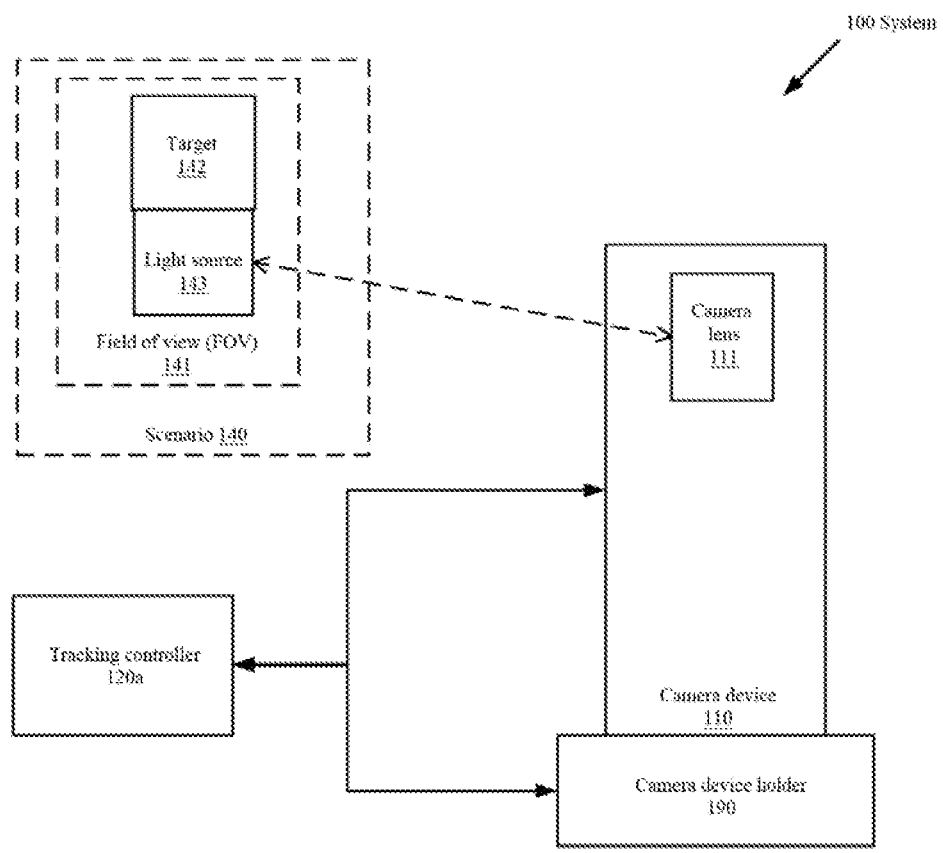
FIG. 1.4

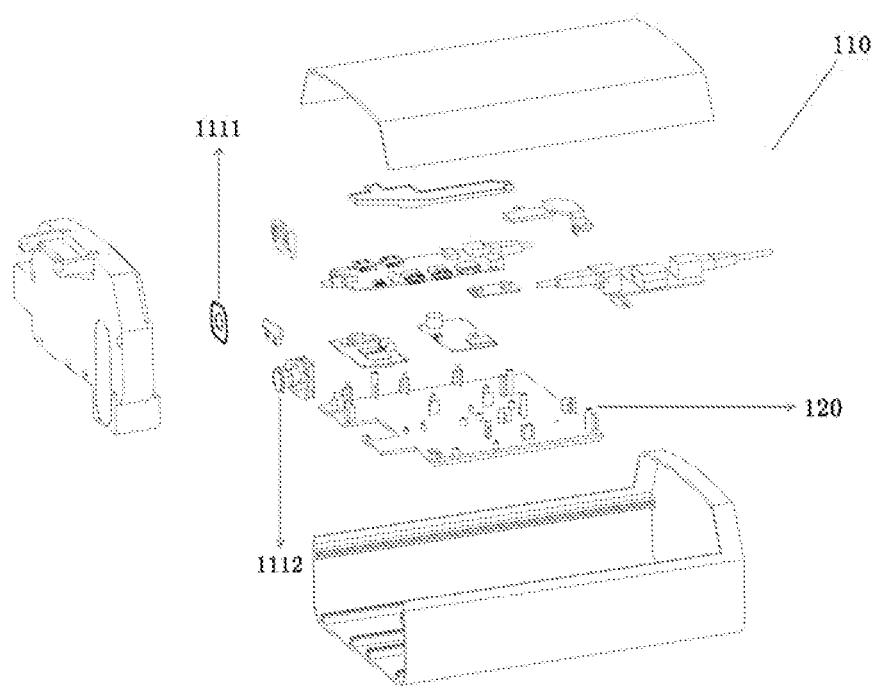
FIG. 2.1

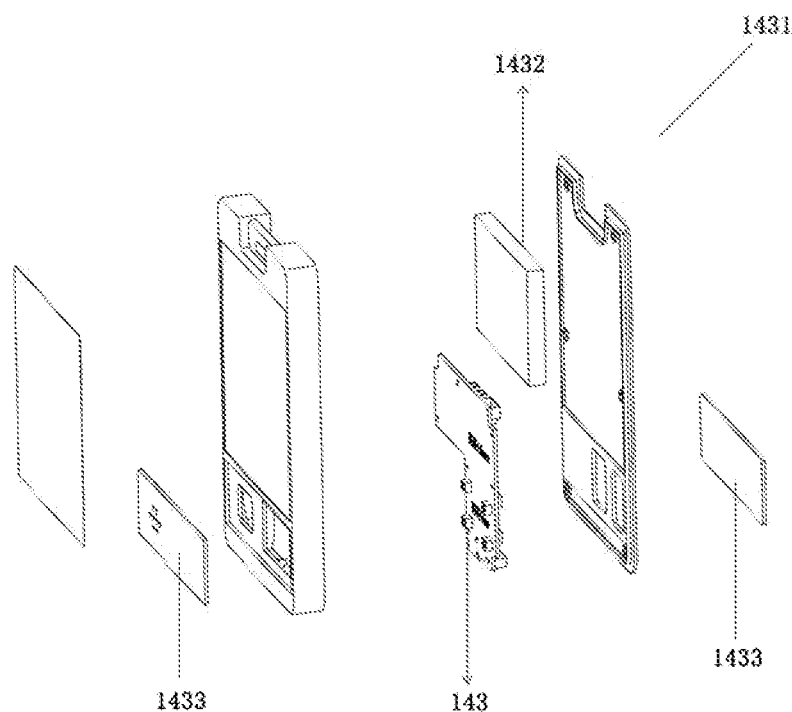
FIG. 2.2

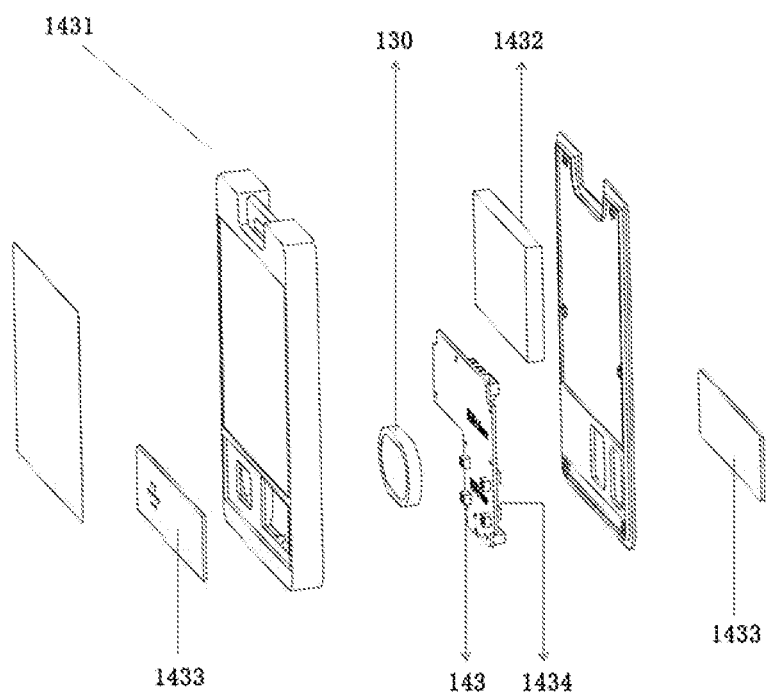
FIG. 2.3

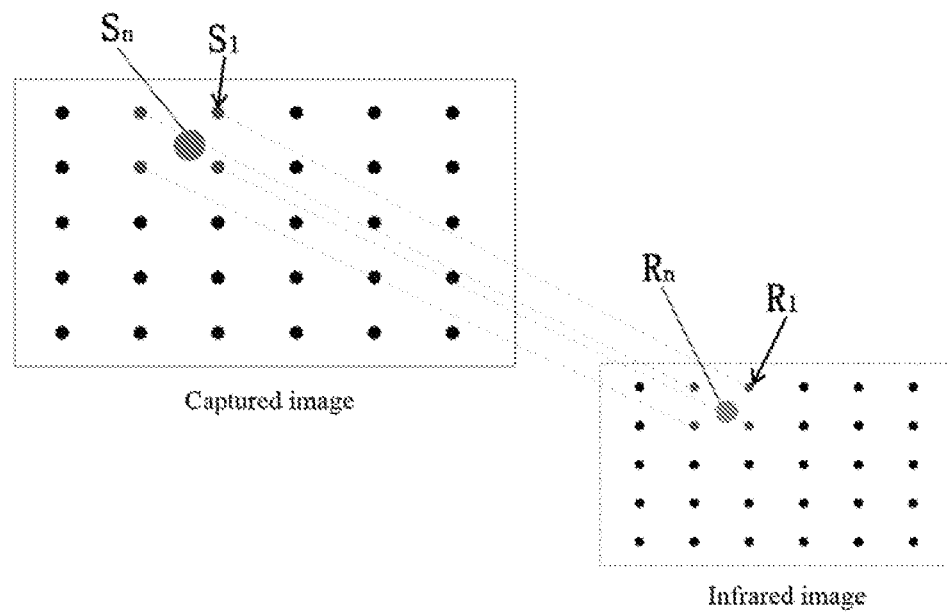
FIG. 3.1
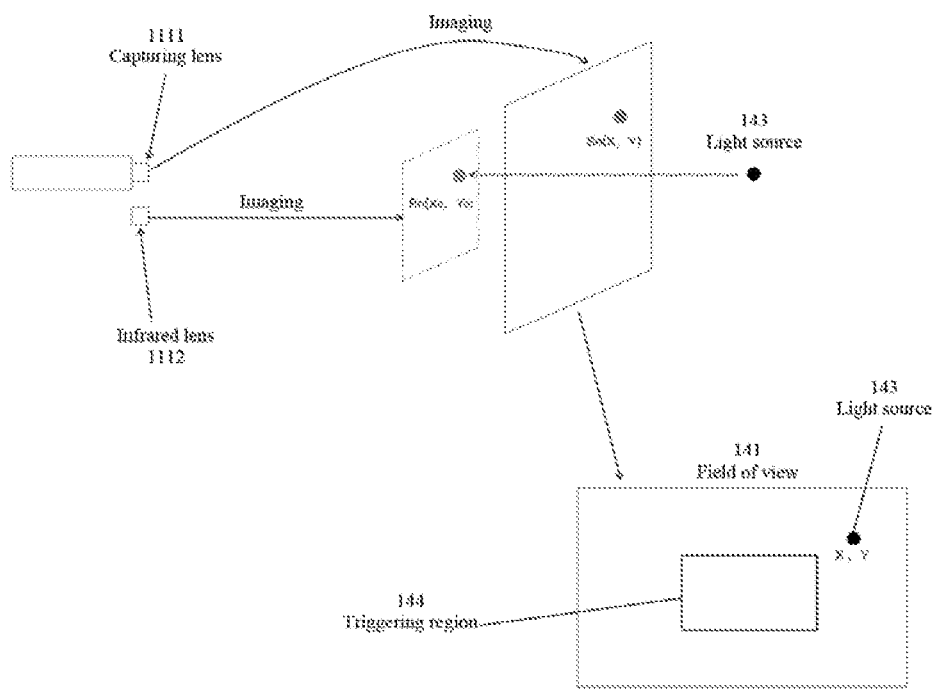
FIG. 3.2

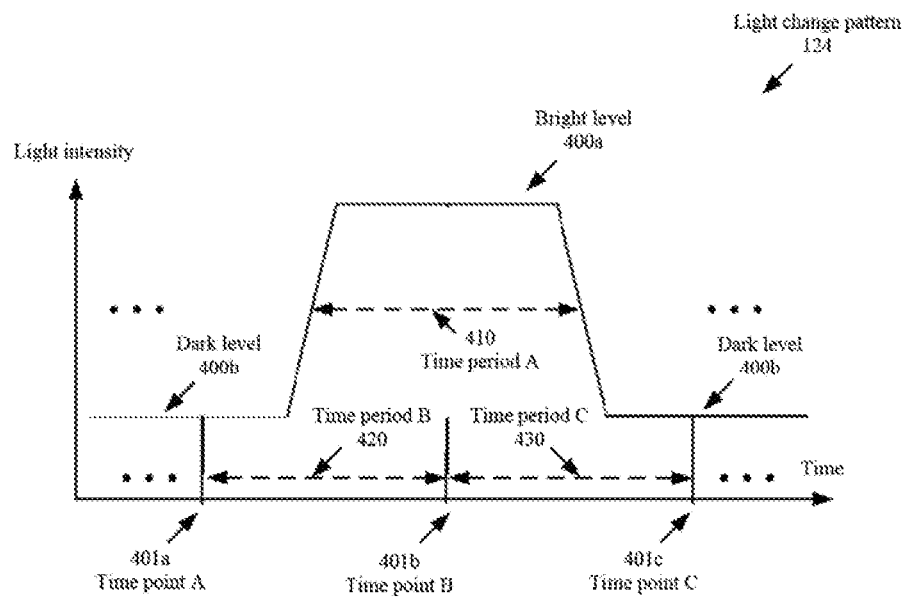
FIG. 4.1
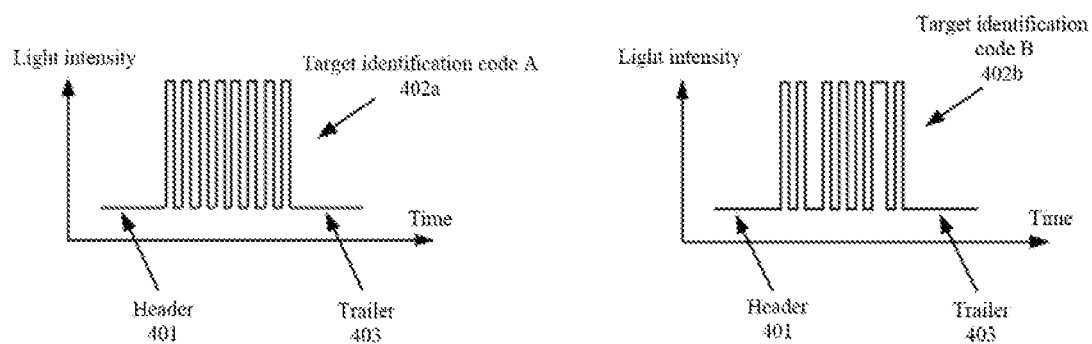
FIG. 4.2

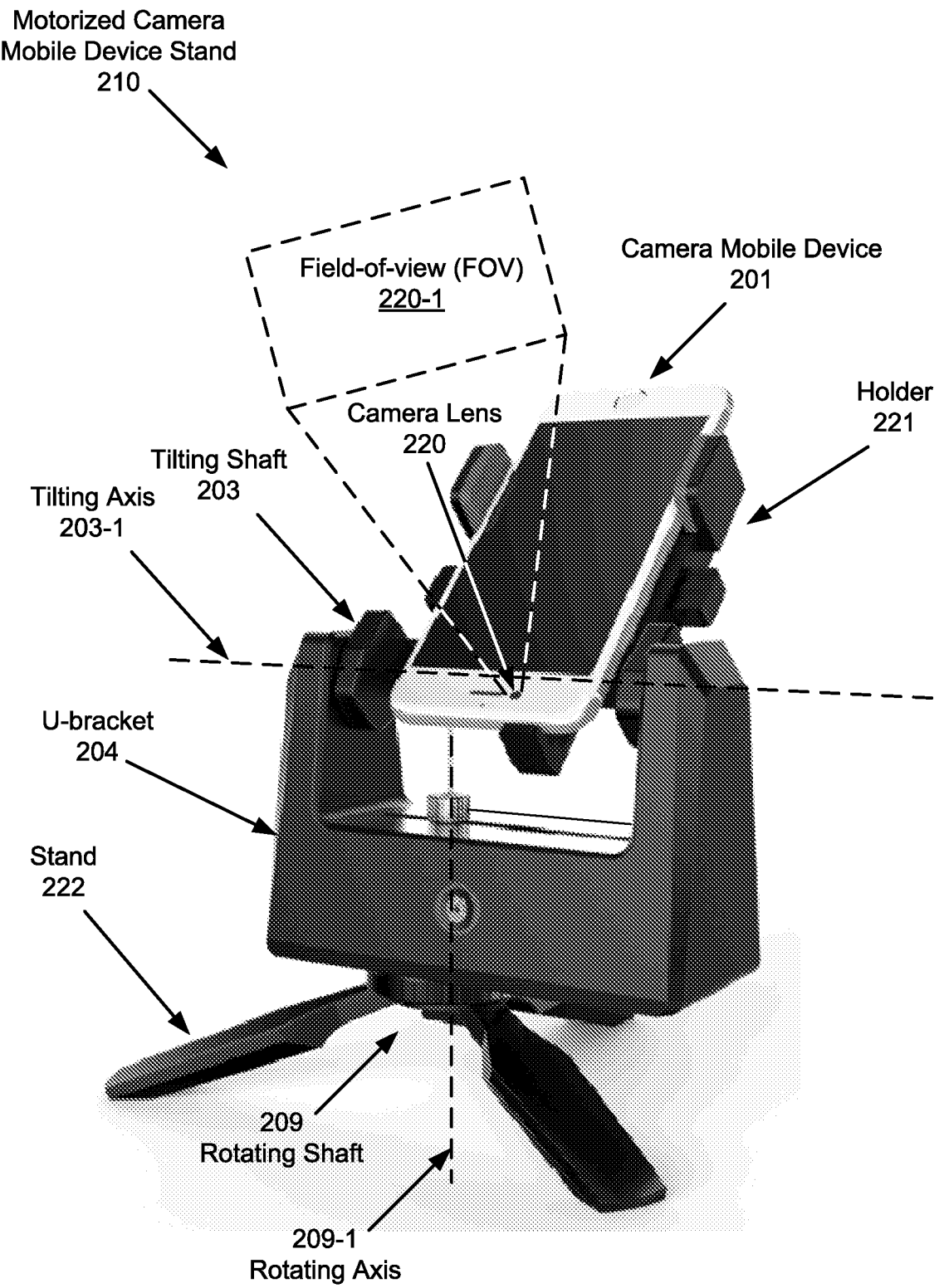
FIG. 9.1

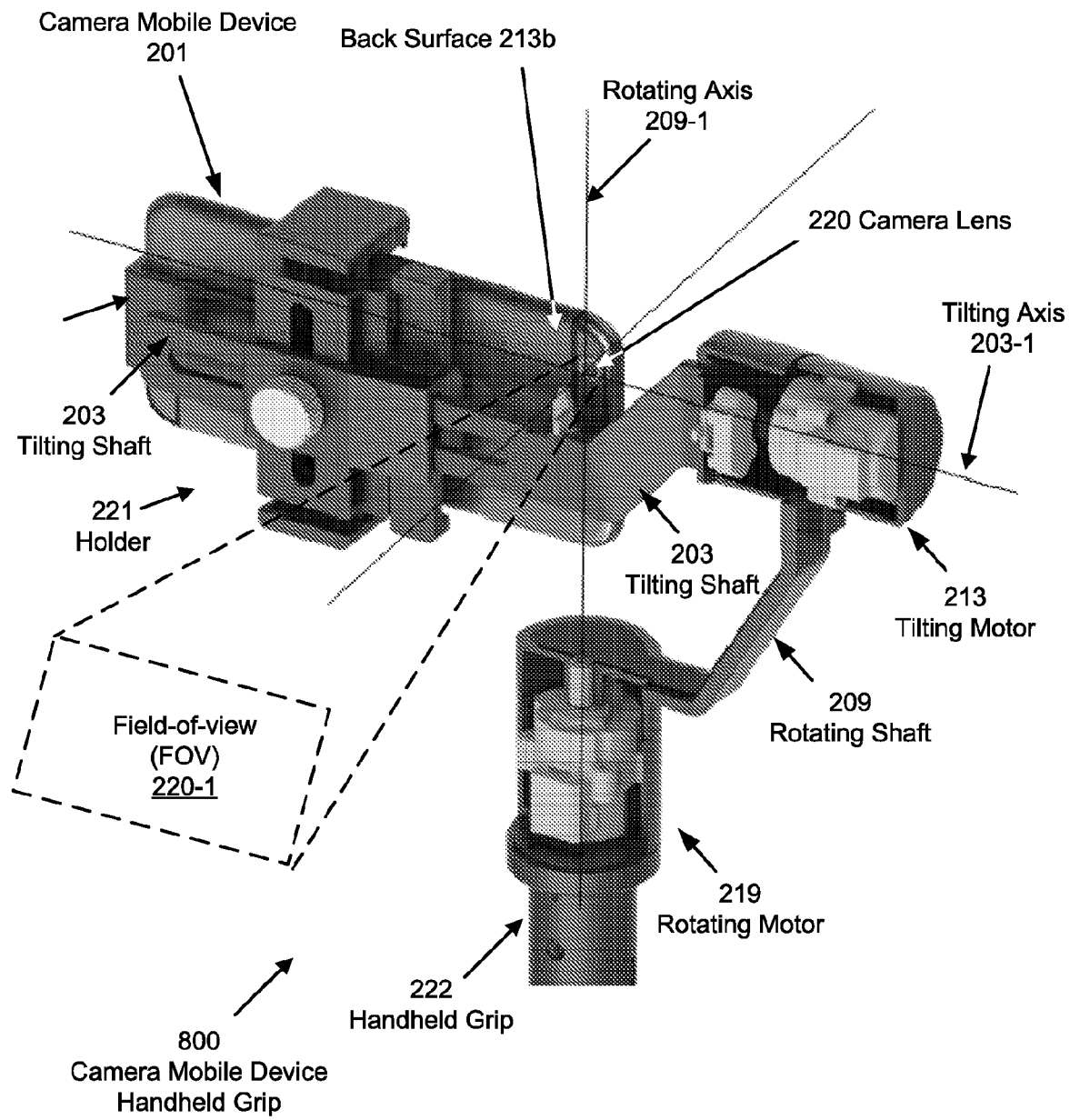
FIG. 9.2

SCENARIO TRIGGERING AND INTERACTION BASED ON TARGET POSITIONING AND IDENTIFICATION

BACKGROUND

A field-of-view (FOV) is an extent of a scene that is imaged by a camera. An object inside the FOV will appear in an image captured and/or outputted by the camera. For example, the FOV may correspond to a solid angle within which a camera lens projects light input to an optical sensor of the camera.

Augmented Reality (AR) allows a user to interact with a computer-generated output overlaid on or around objects in a real-world environment. The real-world environment augmented by the overlaying computer-generated output is referred to as the AR environment. In other words, the AR environment is the combination of the real-world environment and the overlaying computer-generated output. Within the AR environment, the view of the combination of the real-world environment and the overlaying computer-generated output is referred to as an AR image presented to the user by an AR device.

SUMMARY

In general, in one aspect, the invention relates to a method for scenario triggering and interaction based on target positioning. The method includes capturing, using a first camera device, a first sequence of images of a scene, determining, based on a pre-determined criterion, a first location of a target object in at least a first image of the first sequence of images, generating, based on a first orientation of the first camera device and the first location of the target object in the first image, a first target object vector from a first camera position of the first camera device to the target object in the scene, identifying a second target object vector from a reference position in the scene to the target object in the scene, determining, by at least computing an intersection between the first target object vector and the second target object vector, a target object position of the target object in the scene, comparing the target object position and a task triggering region in the scene to generate a comparison result, and performing, based on the comparison result, a pre-determined task associated with the task triggering region.

In general, in one aspect, the invention relates to a triggering controller for scenario triggering and interaction based on target positioning. The triggering controller includes a computer processor, and memory storing instructions, when executed, causing the computer processor to determine, based on a pre-determined criterion, a first location of a target object in at least a first image of a first sequence of images of a scene, wherein the first sequence of images is captured using a first camera device, generate, based on a first orientation of the first camera device and the first location of the target object in the first image, a first target object vector from a first camera position of the first camera device to the target object in the scene, identify a second target object vector from a reference position in the scene to the target object in the scene, determine, by at least computing an intersection between the first target object vector and the second target object vector, a target object position of the target object in the scene, and compare the target object position and a task triggering region in the scene to generate a comparison result, wherein a pre-determined task associated with the task triggering region is performed based on the comparison result.

In general, in one aspect, the invention relates to a non-transitory computer readable medium storing instructions for scenario triggering and interaction based on target positioning. The instructions, when executed by a computer processor, comprising functionality for capturing, using a first camera device, a first sequence of images of a scene, determining, based on a pre-determined criterion, a first location of a target object in at least a first image of the first sequence of images, generating, based on a first orientation of the first camera device and the first location of the target object in the first image, a first target object vector from a first camera position of the first camera device to the target object in the scene, identifying a second target object vector from a reference position in the scene to the target object in the scene, determining, by at least computing an intersection between the first target object vector and the second target object vector, a target object position of the target object in the scene, comparing the target object position and a task triggering region in the scene to generate a comparison result, and performing, based on the comparison result, a pre-determined task associated with the task triggering region.

Other aspects of the invention will be apparent from the following description and the appended claims.

BRIEF DESCRIPTION OF DRAWINGS

FIGS. 1.1, 1.2, 1.3 and 1.4 show example schematic block diagrams of systems according to one or more embodiments of the invention.

FIGS. 2.1, 2.2 and 2.3 show example schematic structural diagrams of a camera device and a box according to one or more embodiments of the invention.

FIGS. 3.1 and 3.2 show example schematic diagrams of mapping of a light source from a camera lens to a field of view according to one or more embodiments of the invention.

FIGS. 4.1, 4.2 and 5 show example schematic diagrams of light source patterns and detection according to one or more embodiments of the invention.

FIGS. 9.1 and 9.2 show example schematic structural diagrams of a camera device holder according to one or more embodiments of the invention.

DETAILED DESCRIPTION

Figure 1A:
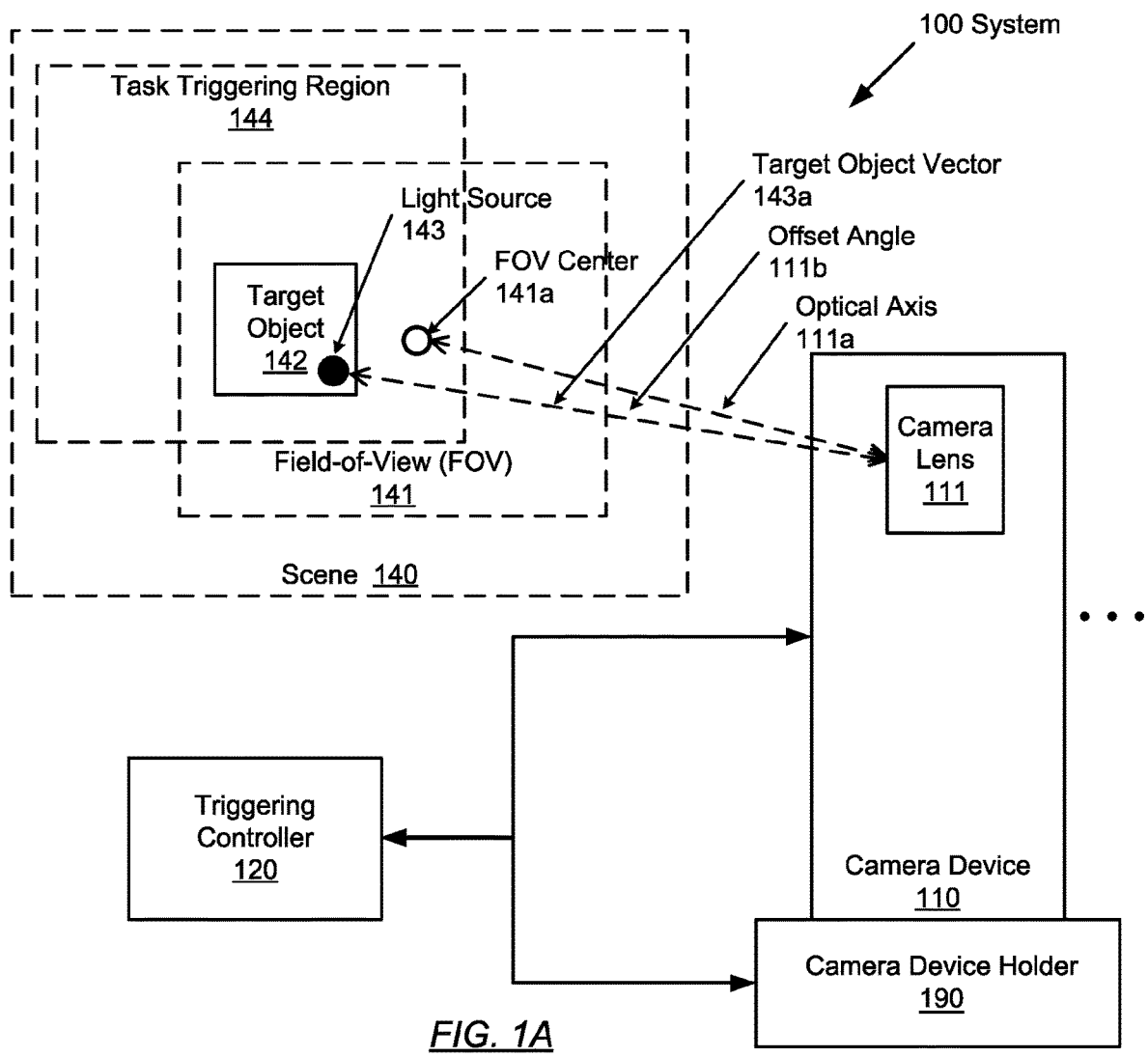
FIGS. 1A, 1B, and 1C show schematic block diagrams of a system in accordance with one or more embodiments of the invention.

Specific embodiments of the invention will now be described in detail with reference to the accompanying figures. Like elements in the various figures may be denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist. Further, a solid line or a dash line connecting the components of a figure represent a relationship between the connected components. The dash line indicates that the relationship may not include or otherwise associate with any physical connection or physical element.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a computer readable medium for scenario triggering and interaction based on target positioning. In one or more embodiments of the invention, two or more camera devices are used to monitor a target object in a scene. A target object vector is generated from captured images of each camera device to represent a line of sight from the camera device to the target object. The target object position in the scene is then determined from an intersection of the target object vectors of the camera devices. The target object position is compared with a task triggering region in the scene to trigger a pre-determined task when the target object is within or around the task triggering region. In one or more embodiments of the invention, the target object is a human user and augmented reality contents are presented to the human user when the human user is detected to be within or around the task triggering region.

FIG. 1A shows a system (100) in accordance with one or more embodiments. In one or more embodiments, one or more of the modules and elements shown in FIG. 1A may be omitted, repeated, and/or substituted. Accordingly, embodiments of the invention should not be considered limited to the specific arrangements of modules shown in FIG. 1A.

As shown in FIG. 1A, the system (100) includes a camera device (110) having a camera lens (111), a triggering controller (120), a camera device holder (190), a scene (140), a field-of-view (FOV) (141) of the camera lens (111), an target object (142) appearing within the FOV (141), and a light source (143) attached to the target object (142). Further, the camera device (110), triggering controller (120), and camera device holder (190) are communicatively coupled to each other. In one or more embodiments of the invention, two or more of the camera device (110), triggering controller (120), and camera device holder (190) are integrated into a single device. For example, at least a portion of the triggering controller (120) may be included in the camera device (110). In another example, at least a portion of the triggering controller (120) may be included in the camera device holder (190). In still another example, one part of the triggering controller (120) is included in the camera device (110) while another part of the triggering controller (120) is included in the camera device holder (190).

In one or more embodiments of the invention, the light source (143) is any device that emits light. In one or more embodiments, the light source (143) includes a light-emitting-diode (LED). In one or more embodiments, the light source (143) emits a strobe light, which changes intensity and/or color from time to time. For example, the strobe light may emit a free-running light change pattern according to a particular duty cycle (i.e., a percentage of time when the light pattern has a bright level) and repetition rate (i.e., a number of time the intensity changes during a unit time period). As used herein, light change pattern is a pattern of intensity and/or color change in the light. In one or more embodiments, the light source (143) emits a light change pattern with a low repetition rate (e.g., 10 hertz, 20 hertz, etc.) comparing to a frame rate of the camera device (110). The frame rate is a number of images (e.g., a burst of still images or a video recording) captured by the camera device (110) during a unit time. In one or more embodiments, the light source (143) emits a light change pattern that is synchronized with the frame rate of the camera device (110).

In one or more embodiments of the invention, the camera device (110) is a device with a camera lens (e.g., camera lens (111)) and associated components for taking photographs and/or video recordings. A dedicated camera with communication capability is an example of the camera device (110). In one or more embodiments, the camera device (110) is a mobile device, such as a mobile phone with a built-in camera, referred to as a smart phone. A smart phone may have a display with graphical user interface that occupy a large portion (e.g., 70% or larger) of the front surface. The camera lens (111) may be on the front surface or back surface of the smart phone. In one or more embodiments, the camera device (110) includes a timer to control the frame rate of image capture based on the duty cycle and/or repetition rate of the light source (143).

In one or more embodiments, the scene (140) is a place where an action or event, imaged by the camera device (110), occurs. The action or event may relate to the target object (142), which is any physical thing that can be seen or touched. The target object (142) may be stationary or mobile in the scene (140). For example, the target object (142) may be a human or a physical item held by, worn on, or otherwise associated with the human. The field-of-view (FOV) (141) is an extent of the scene (140) that is imaged by the camera device (110) using the camera lens (111). In other words, an object inside the FOV (141) will appear in an image captured and/or outputted by the camera device (110). For example, the FOV (141) may correspond to a solid angle (referred to as the FOV solid angle) within which the camera lens (111) projects light input to an associated optical sensor (not shown) of the camera device (110). In particular, the optical axis (111a) of the camera lens (111) is a bi-directional line passing through the camera lens (111), more specifically the optical center of the camera lens (111), and the FOV center (141a) of the FOV (141). The optical center of the camera lens (111) is referred to as the position of the optical lens (111) and the camera device (110). The orientation/direction of the optical axis (111a) is referred to as the orientation of the camera lens (111) and the camera device (110). As noted below, the position and orientation of the camera lens (111) and camera device (110) may be adjusted using the camera device holder (190) and the triggering controller (120) such that the target object (142) and the light source (143) are within the FOV (141). The position and orientation of the camera lens (111) and camera device (110) are recorded by the camera device holder (190) and/or the triggering controller (120).

Figure 1B:
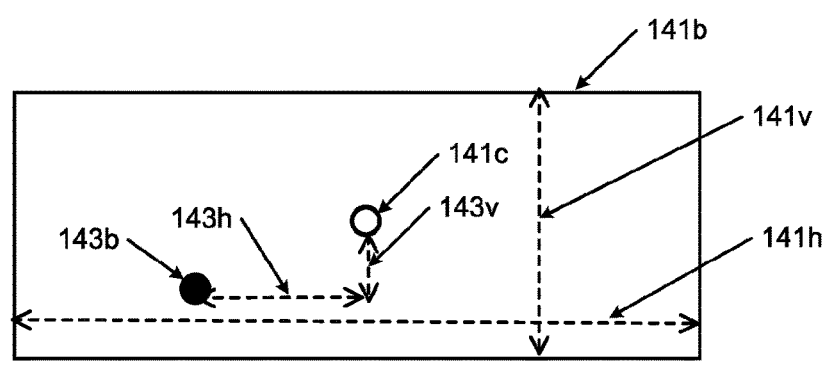

Another bi-directional line passing through the camera lens (111), more specifically passing through the optical center of the camera lens (111), and the light source (143) is referred to as an target object vector (143a), which represents the line of sight of the light source (143) from the perspective of the camera lens (111). The angle between the target object vector (143a) and the optical axis (111a) is referred to as an offset angle (111b). FIG. 1B shows a schematic diagram of a captured image (141b) of the camera device (110). As shown in FIG. 1B, the captured image (141b) has a horizontal dimension (141h), a vertical dimension (141v), an image center (141c), and a light source image (143b). The horizontal dimension (141h) and the vertical dimension (141v) correspond to the horizontal extent and the vertical extent of the FOV (141), respectively. The image center (141c) and the light source image (143b) correspond to the FOV center (141a) and the light source (143), respectively. The displacement between the image center (141c) and the light source image (143b) includes a horizontal displacement (143h) and a vertical displacement (143v). The horizontal dimension (141h), vertical dimension (141v), horizontal displacement (143h), and vertical displacement (143v) may be measured in terms of image pixels. The ratio between the horizontal dimension (141h) (denoted as $D_h$) and the horizontal displacement (143h) (denoted as $d_h$) corresponds to the ratio between the horizontal portion (denoted as $\theta_h$) of the FOV solid angle and the horizontal portion (denoted as $\Omega_h$) of the offset angle (111b), as described by Eq. (1) below. The ratio between the vertical dimension (141v) (denoted as $D_v$) and the vertical displacement (143v) (denoted as $d_v$) corresponds to the ratio between the vertical portion (denoted as $\theta_v$) of the FOV solid angle and the vertical portion (denoted as $\Omega_h$) of the offset angle (111b), as described by Eq. (2) below.

$$D_h/d_h = (\text{TAN}(\theta_h/2))/(\text{TAN } \Omega_h) \text{ or } \Omega_h = \text{TAN}^{-1}((\text{TAN}(\theta_h/2))*(d_h/D_h)) \qquad \text{Eq. (1)}$$

$$D_v/d_v = (\text{TAN}(\theta_v/2))/(\text{TAN } \Omega_v) \text{ or } \Omega_v = \text{TAN}^{-1}((\text{TAN}(\theta_v/2))*(d_v/D_v)) \qquad \text{Eq. (2)}$$

where TAN denotes the trigonometric tangent function and $\text{TAN}^{-1}$ denotes the trigonometric arc-tangent function.

Based on the known horizontal and vertical dimensions ($D_h$, $D_v$) of the captured image and the known horizontal and vertical portions ($\theta_h$, $\theta_v$) of the FOV solid angle, the horizontal and vertical portions ($\Omega_h$, $\Omega_v$) of the offset angle (111b) may be computed using Eq. (1) and Eq. (2) based on the measured horizontal displacement (143h) ($d_h$) and vertical displacement (143v) ($d_v$) in the captured image (141b). Based on the known/recorded position (i.e., optical center) and orientation of the camera device (110), the optical axis (111a) is represented by Eq. (3) below.

$$Ax+By+Cz+D=0 \qquad \text{Eq. (3)}$$

where x, y, z correspond to the coordinates in the physical space throughout the system (100), and the coefficients A, B, C, and D are dependent on the position and orientation of the camera device (110). Eq. (4) below representing the target object vector (143a) is then derived by applying a rotation matrix of the offset angle (111b) to Eq. (3). Mathematically, the rotation matrix of the offset angle (111b) rotates the optical axis (111a) around the position of the camera device (110) to yield the Eq. (4) representing the target object vector (143a).

$$A'x+B'y+C'z+D'=0 \qquad \text{Eq. (4)}$$

where the coefficients A', B', C', and D' are derived from the coefficients A, B, C, and D based on the rotation matrix of the offset angle (111b).

In a simplified example of rotating a line in a two-dimensional space where the camera device is positioned at the origin, the optical axis represented by the equation $Ax+By+C=0$ is rotated into the target object vector represented by the equation $A'x+B'y+C'=0$ using the rotation matrix $$R_\theta = \begin{pmatrix} \cos\theta & -\sin\theta \\ \sin\theta & \cos\theta \end{pmatrix}$$

where θ represents the two-dimensional offset angle.

Returning to the discussion of FIG. 1A, the light source (143) is attached to the target object (142) and is considered as representing the position of the target object (142). In this context, the position of the light source (143) and the position of the target object (142), collectively referred to as the target object position, are considered to be the same for the purpose of target positioning and identification. Similarly, the position of the camera lens (111) and the position of the camera device (110) are considered to be the same. Accordingly, the target object vector (143a) is referred to as being from the camera device (110) to the target object (142).

In one or more embodiments, the FOV (141) corresponds to different portions of the scene (140) according to how the camera lens (111) is oriented toward, zoomed with respect to, or otherwise positioned relative to, the scene (140). At the same time, the orientation and position of the optical axis (111a) vary accordingly. In one or more embodiments, the camera device (110) includes a hardware component, a software component, or a combination thereof. In one or more embodiments, the camera device (110) may include, or otherwise be implemented using, at least a portion of the computing system (700) and network (720) described in reference to FIGS. 11A and 11B below.

In one or more embodiments, the task triggering region (144) corresponds to a portion of the scene (140) where a pre-determined task is triggered when the target object position is within or around the task triggering region (144). The postulated sequence of detecting the target object position and triggering the pre-determined task is referred to as a scenario.

In one or more embodiments of the invention, the camera device holder (190) is configured to mechanically hold the camera device (110) and to adjust, in response to a control signal from the triggering controller (120), the FOV (141) of the camera lens (111) to cover various portions of the scene (140). For example, the camera device holder (190) may include a motorized tilt and swivel device for adjusting a camera angle of the camera lens (111), otherwise referred to as the orientation of the camera device (110). In another example, the camera device holder (190) may include a motorized horizontal and vertical sliding device for adjusting a position of the camera device (110) relative to the scene (140). The sliding device may include a mechanical stage for holding and moving the camera device (110). In one or more embodiments, the FOV (141) encompasses the entirety of the scene (140) without adjusting the orientation and/or the position of the camera device (110). In such embodiments, the camera device holder (190) may be omitted from the system (100).

In one or more embodiments, the triggering controller (120) includes a hardware component, a software component, or a combination thereof that is configured to detect the target object position and trigger the pre-determined task. Although only one camera device is explicitly shown in FIG. 1A, multiple camera devices may exist and communicatively coupled to the triggering controller (120) to cooperatively detect the target object position and trigger the pre-determined task. In one or more embodiments, the triggering controller (120) performs such functionalities using the method described in reference to FIGS. 2A-2B below. In one or more embodiments, the triggering controller (120) include the components described in reference to FIG. 1C below.

Figure 1C:
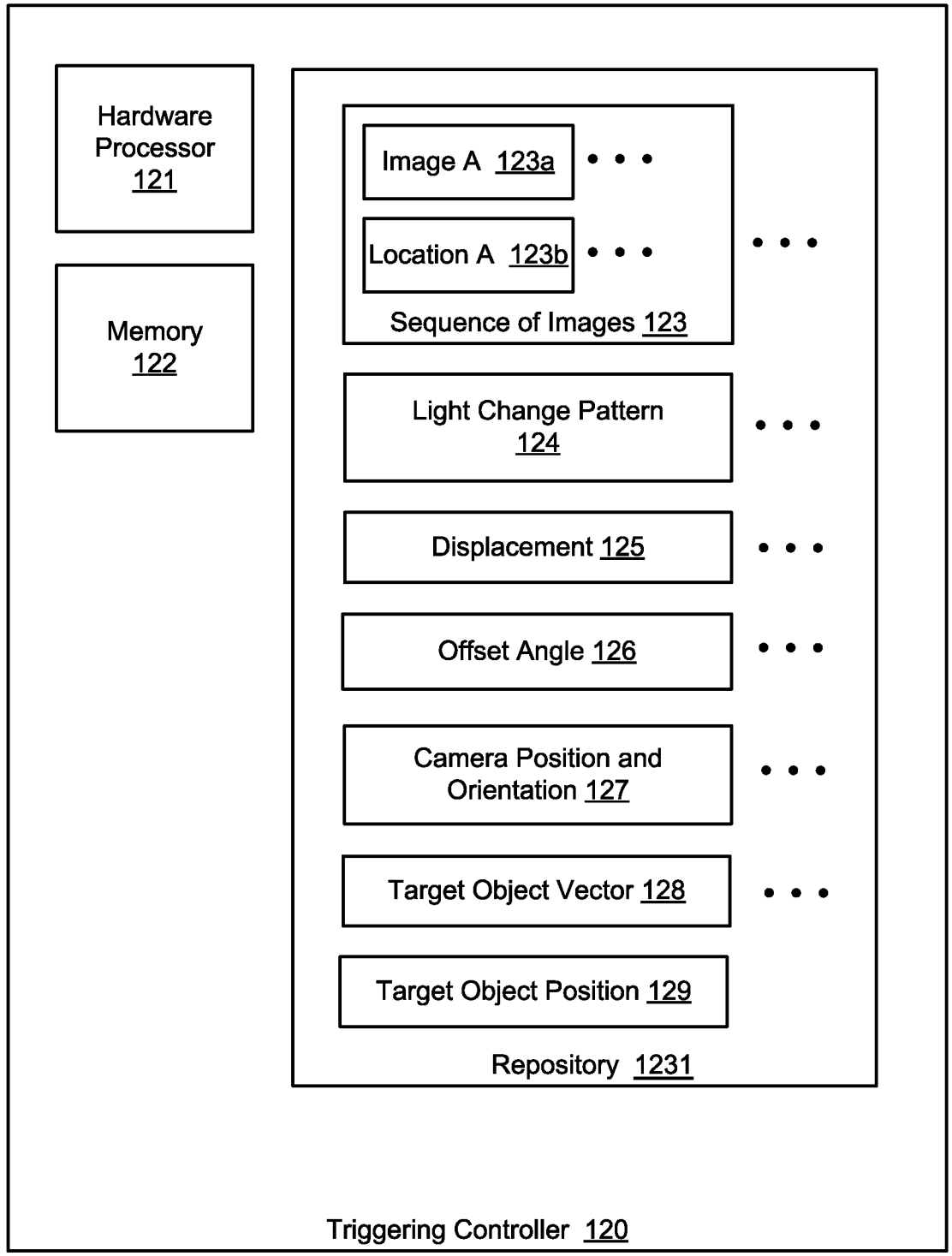

FIG. 1C shows details of the triggering controller (120) in accordance with one or more embodiments. The following description of FIG. 1C refers to various components depicted in FIG. 1A above. In one or more embodiments, one or more of the modules and elements shown in FIG. 1C may be omitted, repeated, and/or substituted. Accordingly, embodiments of the invention should not be considered limited to the specific arrangements of modules shown in FIG. 1C.

As shown in FIG. 1C, the triggering controller (120) includes a hardware processor (121), memory (122), and repository (1231). In one or more embodiments of the invention, the hardware processor (121) corresponds to the computer processors (702) depicted in FIG. 11A below. Similarly, the memory (122) and repository (123) correspond to the non-persistent storage (704) and/or persistent storage (706) depicted in FIG. 11A below. For example, the memory (122) may store software instructions that, when executed, cause the hardware processor (121) to perform the target object position detection and task triggering functionalities of the system (100) depicted in FIG. 1A above. In one or more embodiments, the triggering controller (120) performs the target object position detection and task triggering functionalities according to the method flowchart described in reference to FIGS. 2A and 2B below. In one or more embodiments, the memory (122) stores instructions to perform one or more portions of the method flowchart described in reference to FIGS. 2A and 2B below. In one or more embodiments, the triggering controller (120) and the camera device (110) are integrated into a single device. In such embodiments, the instructions to perform one or more portions of the method flowchart described in reference to FIGS. 2A and 2B may be part of a mobile application, or mobile app, which is a user-installable software application designed to run on a smart phone or other mobile devices.

Further as shown in FIG. 1C, the repository (1231) includes stored data items that represent a sequence of images (123), an light change pattern (124), a displacement (125), an offset angle (126), camera position and orientation (127), a target object vector (128), and a target object position (129). Although only one set of sequence of images (123), light change pattern (124), displacement (125), offset angle (126), camera position and orientation (127), and target object vector (128) are explicitly shown in FIG. 1C, multiple sets of these stored data items exist corresponding to multiple camera devices not explicitly shown in FIG. 1A above. In particular, the sequence of images (123) includes consecutive images (e.g., image A (123a) schematically shown as image (141b) in FIG. 1B above) captured by the camera device (111). For example, the image A (123a) corresponds to a portion of the scene (140) that is covered by the FOV (141) at a particular time point. The light change pattern (124) is a pattern of light intensity and/or color alternating between different intensity levels and/or colors across the sequence of images (123). In one or more embodiments, the light change pattern (124) corresponds to a spot in each image of the sequence of images (123). For example, the spot may be defined by a single pixel location or a location of connected pixels in each image, such as the location A (123b) in the image A (123a). In one or more embodiments, the light change pattern (124) is caused by a strobe light emitted from the light source (143) and indicates a location of the light source (143) within each image. In other words, the location of the light source (143) within each image may be determined based on where the light change pattern (124) is found across the sequence of images (123). For example, the light change pattern (124) indicates that the light source (143) is at the light source image (143b) in the image (141b) depicted in FIG. 1B. Similarly, each other image in the sequence of images (123) is associated with a location of the light source (143).

The displacement (125) is the distance vector between the light source image (143b) and the image center (141c) within an image schematically represented in FIG. 1B above. In one or more embodiments, the displacement (125) includes a horizontal direction distance and a vertical distance, such as the horizontal displacement (143h) and vertical displacement (143v) depicted in FIG. 1B above. The displacement (125) may be represented based on a number of pixels or any other suitable distance scale. The offset angle (126) is a measure of the offset angle (111b) depicted in FIG. 1A above. The offset angle (126) may be represented based degrees or radians of the horizontal and vertical portions ($\Omega_h$, $\Omega_{h,v}$) of the offset angle (111b) depicted in FIG. 1A above. The camera position and orientation (127) are coordinates of the optical center and orientation of the optical axis of the camera device. For example, the orientation of the optical axis of the camera device may represented by the coefficients A, B, C, and D in Eq. (3) above. The target object vector (128) is a measure of the target object vector (143a) depicted in FIG. 1A above. The target object vector (127) may represented by the coefficients A', B', C', and D' in Eq. (4) above.

Although a single target object vector (128) is explicitly shown in FIG. 1C, multiple target object vectors, not explicitly shown, are stored in the repository (1231) that correspond to the multiple camera devices not explicitly shown in FIG. 1A above. The target object position (129) corresponds to the intersection of these multiple target object vectors. The intersection is a contiguous portion of the scene (140)

with a limited dimension (e.g., less than 1 feet, 1 centimeter, etc.) where each of the multiple target object vectors passes through the intersection.

Figure 2A:
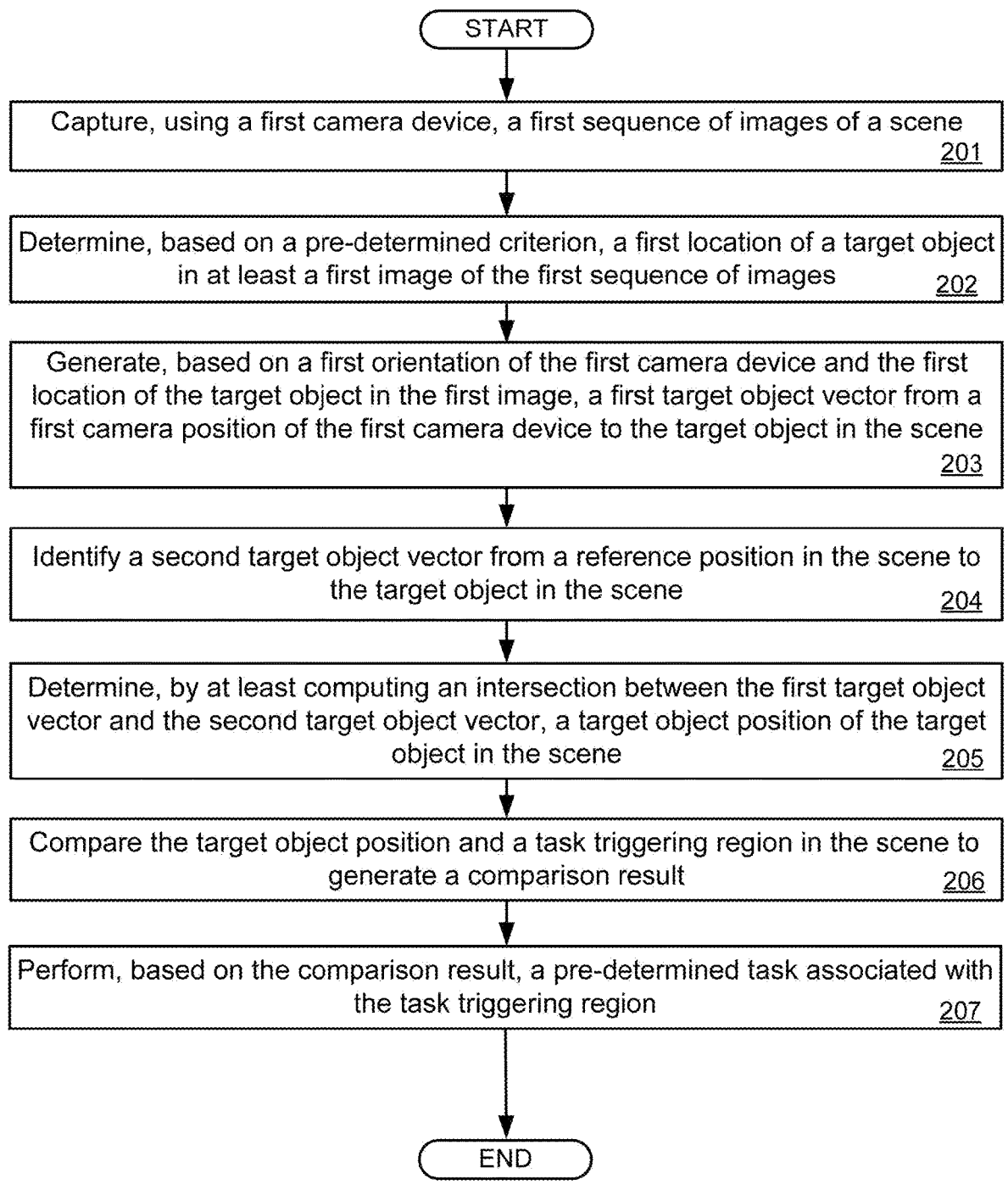
FIGS. 2A and 2B show method flowcharts in accordance with one or more embodiments of the invention.
Figure 2B:
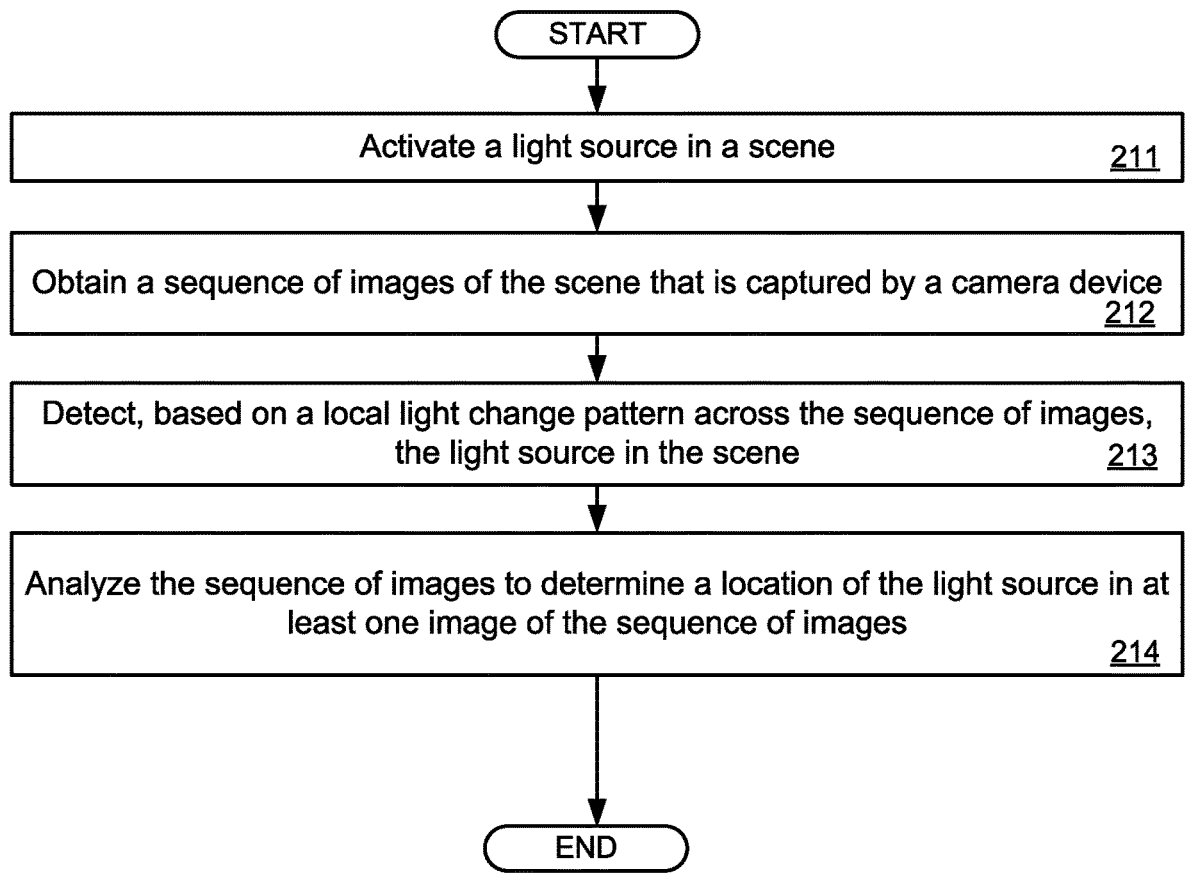

FIGS. 2A and 2B show flowcharts in accordance with one or more embodiments. The process shown in FIGS. 2A and 2B may be executed, for example, by one or more components discussed above in reference to FIGS. 1A and 1B. One or more steps shown in FIGS. 2A and 2B may be omitted, repeated, and/or performed in a different order among different embodiments of the invention. Accordingly, embodiments of the invention should not be considered limited to the specific number and arrangement of steps shown in FIGS. 2A and 2B.

FIG. 2A shows a method flowchart for scenario triggering and interaction based on target positioning. Initially in Step 201, a first sequence of images of a scene is captured using a first camera device.

In Step 202, based on a pre-determined criterion, a first location of a target object in at least a first image of the first sequence of images is determined. In one or more embodiments, the location of the target object in the first image is determined using the method described in reference to FIG. 2B below.

In Step 203, based on a first orientation of the first camera device and the first location of the target object in the first image, a first target object vector from a first camera position of the first camera device to the target object in the scene is generated. In one or more embodiments, a first optical axis equation representing the first optical axis of the first camera device is generated based on the first orientation and the first optical center of the first camera device. The first optical axis equation is in the form of Eq. (3) described in reference to FIGS. 1A and 1B above. In one or more embodiments, a first offset angle between the first target object vector and the first optical axis is determined based on the first location of the target object in the first image. The first offset angle is determined in the form of Eq. (1) and Eq. (2) described in reference to FIGS. 1A and 1B above. Accordingly, a first target object vector equation representing the first target object vector is generated by applying the first offset angle to the first longitudinal vector. Applying the first offset angle to the first longitudinal vector is based on rotation matrix of the offset angle such that the first target object vector equation is in the form of Eq. (4) described in reference to FIGS. 1A and 1B above.

In Step 204, a second target object vector from a reference position in the scene to the target object in the scene is identified. In one or more embodiments, the reference position corresponds to a second camera position of a second camera device in the scene, and the second target object vector is generated in the similar manner as the first target object vector above. Specifically, the second target object vector is generated by applying a second offset angle to a second optical axis of the second camera device. The second offset angle is determined based on a second location of the target object in a second image of a second sequence of images captured by the second camera device. The location of the target object in the second image is determined using the method described in reference to FIG. 2B below.

In Step 205, a target object position of the target object in the scene is determined by at least computing an intersection between the first target object vector and the second target object vector.

In Step 206, the target object position and a task triggering region in the scene is compared to generate a comparison result. In one or more embodiments, the comparison result indicates whether the target object position is within the task triggering region or not.

In Step 207, a pre-determined task associated with the task triggering region is performed based on the comparison result. In one or more embodiments, the target object corresponds to a human user, and performing the pre-determined task is by way of presenting, to the human user, a pre-determined content associated with the task triggering region. In one or more embodiments, the pre-determined content includes augmented reality content that allows the human user to interact with the augmented reality content around the task triggering region. In one or more embodiments, performing the pre-determined task associated with the task triggering region is further based on detecting a pre-determined gesture of the human user is detected in the first sequence of images. The pre-determined gesture corresponds to the human user's interaction with an object in the augmented reality as if the object is in a real physical space. The pre-determined gesture may include thumb up, thumb down, hand waving, throwing, punching, etc.

FIG. 2B shows a method flowchart for determining the location of the target object in an image of a sequence of images. Initially, in Step 211, a light source within a scene is activated. In one or more embodiments of the invention, the light source is attached to the target object in the scene. In one or more embodiments, the light source emits a strobe light, which changes intensity and/or color from time to time. For example, the strobe light emits a free-running light pattern in response to the light source being activated (e.g., turned on). In one or more embodiments, the light source emits a strobe light with a low repetition rate (e.g., 10 hertz, 20 hertz, etc.) comparing to a frame rate of a camera device. In one or more embodiments, the light source emits a strobe light that is synchronized with the frame rate of the camera device. For example, the strobe light may be initiated and/or synchronized based on a trigger signal sent from a tracking controller and/or the camera device.

In Step 212, a sequence of images of the scene is captured by a camera device. In particular, the object is within the field-of-view (FOV) of the camera lens and appears in the sequence of images. For example, the sequence of images may include or be part of a burst of still images. In another example, the sequence of images may include or be part of a video recording. In one or more embodiments, the sequence of images of the scene is captured while the light source emits the strobe light. In one or more embodiments, the frame rate of the sequence of images is selected based on the duty cycle and/or repetition rate of the light source such that consecutive images (or a pair of images with a particular separation in the sequence) include alternating bright level and dark level, and/or alternating colors from the light source. For example, the light source may be free running and the frame rate is selected based on a pre-determined duty cycle and/or repetition rate of the free running light source. In one or more embodiments, a timer of the camera device is used to control image capture according to the selected frame rate.

In one or more embodiments, the duty cycle and/or repetition rate of the light source is selected based on the frame rate of the sequence of images such that consecutive images (or a pair of images with a particular separation in the sequence) include alternating bright level and dark level, and/or alternating colors from the light source. For example, the frame rate may be pre-determined and the light source is synchronized to the frame rate, e.g., based on a trigger signal from the camera device.

In Step 213, based on a local light change pattern across the sequence of images, the light source is detected in the scene. Specifically, the strobe light emitted from the light source causes changes in light intensity and/or color received by an optical sensor of the camera device resulting in the local light change pattern across the sequence of images. In one or more embodiments, the intensity of the strobe light is adjusted to control the size of the location where the local intensity change pattern is found in each image. For example, the location size may be limited to a percentage (e.g., 1%, 3%, etc.) of the horizontal and vertical dimensions of the FOV. In one or more embodiments, the location and the size are defined where the difference in alternating bright level and dark level, and/or alternating colors, in consecutive images, as recognized by the optical sensor of the camera device, exceeds a pre-determined threshold. In one or more embodiments, the location is referred to as the location of the light source in the image.

In one or more embodiments, a pair of images in the sequence of images are compared by subtraction of intensity and/or color values of corresponding pixels. Specifically, the intensity and/or color values are generated by the optical sensor. In particular, the intensity and/or color value of a pixel in one image is subtracted from the intensity and/or color value of the corresponding pixel in another image to generate a subtraction result. The pixel where the difference in alternating bright level and dark level, and/or alternating colors, is found in the subtraction result is selected as part of the location of the light source in the image. Depending on the duty cycle/repetition rate of the light source versus the frame rate of the sequence of images, the pair of images may be consecutive images or two images separated by a particular number of images, such as every three images, etc.

In Step 214, the sequence of images is analyzed to determine a location of the light source in at least one image. In one or more embodiments, the location of the light source is determined based on where the difference in alternating bright level and dark level, and/or alternating colors in the sequence of images, as recognized by the optical sensor of the camera device, exceeds the pre-determined threshold.

FIGS. 1.1 to 1.4 and 2.1 to 10 show various examples in accordance with one or more embodiments of the invention. The examples shown in FIGS. 1.1 to 1.4 and 2.1 to 10 may be, for example, based on one or more components depicted in FIGS. 1A and 1B above and the method flowchart depicted in FIGS. 2A and 2B above. In one or more embodiments, one or more of the modules and elements shown in FIGS. 1.1 to 1.4 and 2.1 to 10 may be omitted, repeated, and/or substituted. Accordingly, embodiments of the invention should not be considered limited to the specific arrangements of modules shown in FIGS. 1.1 to 1.4 and 2.1 to 10.

EXAMPLE 1

This example is an application for automatic capturing in a scenario in one or more embodiments of the invention. As shown in FIG. 1.1, the system 100 includes a camera device 110 with a camera lens 111, a triggering controller 120, a scenario 140, a field of view 141 of the camera lens 111, a target 142 in the scenario, and a light source 143 attached to the target. The light source 143 may be captured by the camera device 110, the triggering controller 120 communicates with the camera device 110, and the field of view 141 is a scene captured by the camera lens 111. In this example, the scene is reflected as an image captured by at least one camera lens at a certain moment or a certain time period. In one or more embodiments of the invention, the scene is reflected as an image having spatial coordinate information, which is captured at a certain moment or a certain time period by cooperation between at least one camera lens and other camera lens or spatial positioning device. As shown in FIG. 2.1, the camera device 110 includes a capturing lens 1111 and an infrared lens 1112 that cooperate with each other. Specifically, as shown in FIG. 3.1, according to the mapping relationship between a plurality of corresponding known coordinate points $S_1$ and $R_1$ of the capturing lens 1111 and the infrared lens 1112, a pixel corresponding relationship $F(R_n)=S_n$ between images captured by the capturing lens 1111 and the infrared lens 1112 is corrected, to map a position of the light source 143 obtained from the image captured by the infrared lens 1112 to that in the image captured by the capturing lens 1111 (see FIG. 3.2). In one or more embodiments of the invention, the camera device may include only one camera lens capable of capturing the light source. The triggering controller 120 and the camera device 110 are disposed in the same device. In another embodiment, the triggering controller 120 may be disposed outside the camera device 110 and communicate with each other through a communication module. In one or more embodiments of the invention, the camera device 110 is a smartphone, and a processor of the smartphone may serve as the triggering controller 120.

In one or more embodiments, the light source 143 is any device capable of emitting light, such as a light emitting diode (LED). As shown in FIG. 2.2, the light source 143 is disposed in a box 1431, the light source 143 is powered by a power supply device 1432, and a light-transmitting plate 1433 is disposed outside the box 1431 such that the light emitted by the light source 143 exits the box 1431. In addition to the box 1431, the light source 143 may also be disposed on other object, such as a bracelet, a hand-held object, an accessory, or a smartphone. The light source 143 emits strobe light, the intensity and/or color of which change with time. For example, the strobe light may emit free-running light change patterns according to a specific duty cycle (that is, a percentage of time when a light pattern has a bright level) and a repetition rate (that is, a number of intensity changes within a unit time period). The "light change pattern" used here is a pattern in which the intensity and/or color of light change. The light source 143 emits a light change pattern having a lower repetition rate or synchronization (for example, 10 Hz, 20 Hz, etc.) in relation to a frame rate of the camera device 110. The frame rate is a number of images (a burst of static images or videos) captured by the camera device 110 per unit time. In this embodiment, a light emitter emits infrared light, and the strobe light has an infrared light wavelength between 700 nm and 1 mm.

Specifically, the camera device 110 captures the strobe light. FIG. 4.1 shows an example of the light change pattern of the light source 143. The horizontal axis corresponds to time, and the vertical axis corresponds to light intensity. The light change pattern is a pattern in which the light intensity alternates between a bright level 400a and a dark level 400b over time. For example, the light intensity of the bright level 400a is maintained in a time period, and can be reproduced over time at a certain repetition rate. When the light intensity alternates between the bright level 400a and the dark level 400b over time, an image sequence is periodically captured by the camera device 110. For example, consecutive images in an image sequence may be captured at time point A 401a, time point B 401b, time point C 401c, etc., and these time points are separated from each other by time period B 420, time period C 430, etc. The time period A 410 includes at least one image capture time point, such as the time point B 401*b*. The alternating sequence of the dark level 400*b* captured at the time point A 401*a*, the bright level 400*a* captured at the time point B 401*b*, the dark level 400*b* captured at the time point C 401*c*, etc. constitute the aforementioned local light change pattern captured by the camera device. Although the light change pattern depicted in FIG. 4.1 is a light intensity change pattern, the light change pattern 124 may further include a wavelength change in other examples. That is, the wavelength change may be represented by different wavelengths, so as to serve as an alternative or supplementary solution of the bright level 400*a* and the dark level 400*b*.

Figure 6:
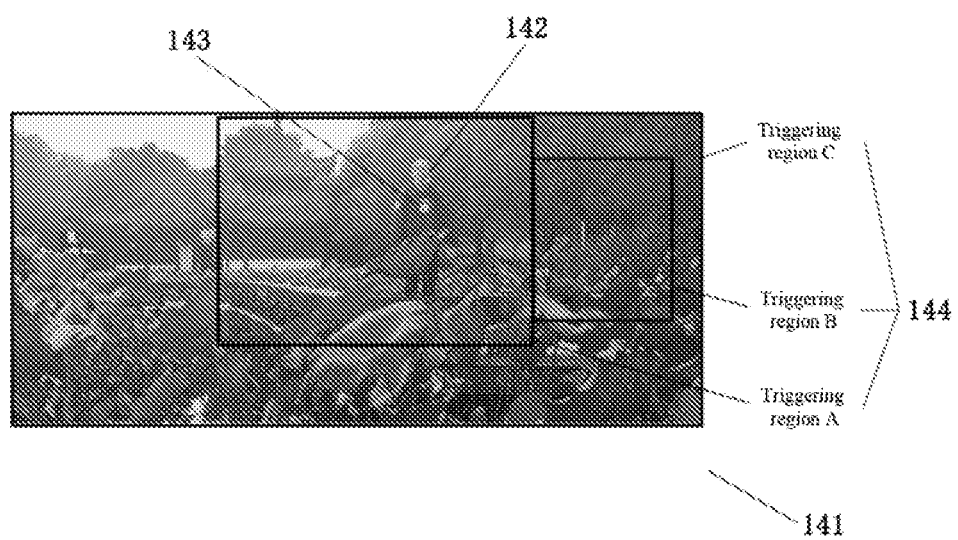
FIG. 6 shows an example schematic diagram of setting a triggering region according to one or more embodiments of the invention.

As shown in FIG. 6, a light change pattern 124 is provided in the field of view 141 of the camera lens 111, the light change pattern 124 is a part or all of the field of view 141, and the triggering region 144 may be a fixed region in the field of view 141 (such as a middle part of the field of view), or selected or derived from the image at the current moment or one or a few moments before. The triggering region 144 may be one or more. A plurality of triggering regions 144 may be connected to each other in the field of view 141 or spaced at different positions in the field of view 141. The triggering region 144 may also be at different positions in the field of view 141 with time.

Figure 5:
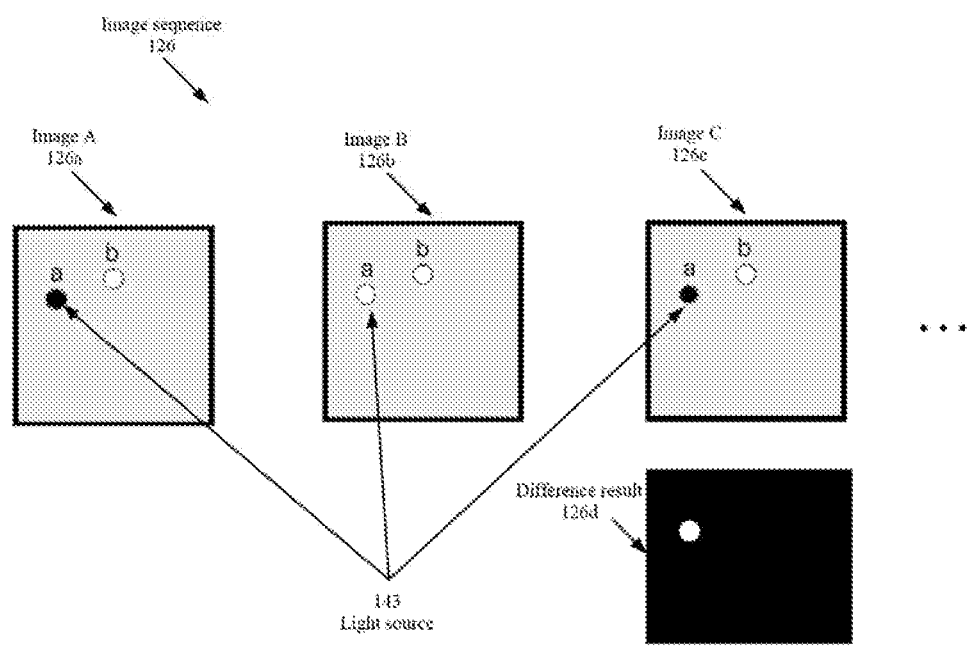

After the camera device captures the image sequence of the scenario, the position of the light source in the field of view 141 is determined. As shown in FIG. 5, the image sequence 126 includes image A 126*a*, image B 126*b*, image C 126*c*, etc. captured at time point A 401*a*, time point B 401*b*, time point C 401*c*, etc. as described in FIG. 4.1 above. According to the example of the light change pattern depicted above with reference to FIG. 4.1, the light source 143 appears as alternating dark spots and bright spots at a position marked "a" in image A 126*a*, image B 126*b*, image C 126*c*, etc. In contrast, the light intensity at another position marked "b" in image A 126*a*, image B 126*b*, image C 126*c*, etc. remains substantially unchanged. For example, the position marked "a" may be determined by a difference result 126*d* obtained by subtracting light intensity values of corresponding pixels in image A 126*a* and image B 126*b*. Similarly, the position marked "a" may also be determined by a difference result 126*d* obtained by subtracting light intensity values of corresponding pixels in image B 126*b* and image C 126*c*, as long as the images are coherent images (such as a first frame of image, a second frame of image, a third frame of image . . . , or such as a second frame of image, a fourth frame of image, a sixth frame of image . . . etc., which are coherent images distributed in the form of arithmetic progression), or a pair of images at a fixed interval (such as a first frame of image and a sixth frame of image at an interval of 5 frames, or a third frame of image and a ninth frame of image at an interval of 6 frames, etc., which are a pair of images selected at a specific fixed interval). In the difference result 126*d*, the black indicates no difference, and the white indicates a non-zero difference or a difference exceeding the aforementioned predetermined threshold. Accordingly, the position of the light source 143 corresponds to the white spot in the difference result 126*d*. After the position of the light source 143 in the image at the current moment or one or a few moments before is obtained, the position of the light source 143 in the field of view 141 at a required moment can be obtained or derived according to the proportional positional relationship between the image and the field of view where the light source 143 is located. For example, the capturing lens image of the capturing lens at the current moment is regarded as the field of view, the light source is captured by the infrared lens, and according to the pixel corresponding relationship between the images captured by the capturing lens and the infrared lens, the position of the light source in the infrared lens image of the infrared lens at the current moment is mapped to the capturing lens image to obtain a position of the light source in the field of view. For another example, the capturing lens image of the infrared lens at the current moment is regarded as the field of view, and the position of the light source in the image at this time is its position in the field of view.

As shown in FIG. 3.2, in this embodiment, the capturing lens image of the capturing lens at the current moment is regarded as the field of view 141, the position of the light source in the infrared lens image of the infrared lens at the current moment is mapped to the capturing lens image as a position of the light source 143 in the field of view 141 (that is, through $F(R_n)=S_n$, the light source coordinates $(X_0, Y_0)$ detected from the infrared lens image are mapped to the coordinates $(X, Y)$ in the field of view, the middle part of the field of view 141 is fixedly used as a triggering region 144, and then the triggering controller 120 can determine with a small amount of calculation whether the triggering condition is satisfied, which can meet the triggering requirement of static or low relative movement speed between the target and the field of view. In other embodiments, a set of positions of the light source in images within a certain time period is used as the position of the light source in the field of view, and a part or all of the range of images within a certain time period is used as the triggering region; or the position of the light source in the image at a past moment or certain time period is used as the position of the light source in the field of view, and a part or all of the range of the image at the current moment is used as the triggering region.

When the triggering controller 120 detects that the position of the light source 143 satisfies the triggering condition, for example, when the light source is located in the triggering region 144, or when a specific number of light sources are located in different triggering regions 144, or when the light source is located somewhere outside the triggering region 144, the triggering controller 120 controls the camera device to carry out capturing, time-lapse capturing, or photographing. In other embodiments, the triggering controller may also be connected to a third-party triggering device 130, such as audio or light, so as to generate different triggering effects when the triggering condition is satisfied. In one or more embodiments, a plurality of triggering regions are provided in the same field of view, so that different triggering regions correspond to different triggering actions, such as controlling different devices. In one or more embodiments, a plurality of triggering regions cooperates to implement more complex triggering logic. For example, the triggering action for the target to move from the triggering region A to the triggering region C is different from that from the triggering region B to the triggering region C. In other embodiments, in addition to the positional relationship between the light source and the triggering region, the triggering condition may also be combined with other conditions, such as a condition that the target completes a specified action in the triggering region or the light source completes a specific trajectory movement in the triggering region.

In one or more embodiments, the triggering condition is determined based on the positional relationship between the light source and the triggering region in combination with a time period, and the time period may be set by a timer or a metronome and controlled by the triggering controller 120.

In one or more embodiments, the system 100 combines sound equipment and light equipment to prompt the target 142 for a time period. For example, when a speaker plays music or voice, the target 142 can know or predict the triggering or the determination on the triggering condition at a certain time point or time period (such as a certain drumbeat or chorus of music). For another example, through the irradiation position of light, the target 142 can know or predict at which position the triggering or the determination on the triggering condition is carried out at a certain time point or time period. The settings of the above equipment enable the target 142 to better complete the triggering or satisfy the triggering condition.

In one or more embodiments, the triggering condition is determined based on the positional relationship between the light source and the triggering region in combination with environmental characteristics, such as detecting the humidity and illumination of the environment by a sensor, or carrying out screen analysis through an image captured by the camera device, or transmitting environmental characteristic information to the triggering controller 120 by means of network access and direct reading, so that the triggering controller 120 can set different triggering conditions according to different environmental characteristics, for example, adjust the triggering condition of the positional relationship between the light source and the triggering region according to different light intensities in the screen. In one or more embodiments, the system 100 combines sound equipment and light equipment to prompt the target 142 under specific environmental characteristics. For example, when a speaker plays a voice, the target 142 can make an action that matches the environmental characteristics, or be at a position that matches the environmental characteristics, such as instructing the target 142 to catch rain when it is raining, or instructing the target 142 to be located on the same side of the field of view as the rainbow when the rainbow appears. The settings of the above equipment enable the target 142 to better complete the triggering or satisfy the triggering condition.

In one or more embodiments, the triggering condition is determined based on the positional relationship between the light source and the triggering region in combination with third-party information. For example, an image is sent to a server with a face recognition function by means of a network, the server transmits determination information to the triggering controller 120, and the triggering controller 120 carries out triggering in combination with the positional relationship between the light source and the triggering region. For another example, a reception module is configured to connect with a third-party device, and when the third-party device is activated or at a preset position, the determination information is transmitted to the triggering controller 120 by the reception module, and the triggering controller 120 carries out triggering in combination with the positional relationship between the light source and the triggering region.

In one or more embodiments, the system may directly adopt the existing camera device. When the original camera lens of the existing camera device cannot capture an infrared light source, an infrared lens is configured to capture an image, which is calibrated with the image captured by the original camera lens, and then the existing camera device communicates with the triggering controller to serve as a camera device of this system. When the original camera lens of the existing camera device can capture the infrared light source, the existing camera device communicates with the triggering controller to serve as a camera device of this system.

EXAMPLE 2

On the basis of Example 1, this example further realizes a precise interaction function with the target. As shown in FIG. 1C, the system 100 includes a camera device 110 with a camera lens 111, a triggering controller 120, a signal transmission module 150, a scenario 140, a field of view 141 of the camera lens 111, a target 142 in the scenario, a light source 143 attached to the target, a signal reception module 160, and an interactive device 130. The light source 143 may be captured by the camera device 110, the triggering controller 120 and the camera device 110 communicate with the signal transmission module 150, and the signal reception module 160 communicates with the interactive device 130, that is, both the camera device 110 and the interactive device 130 are triggering devices that can be controlled by the triggering controller 120. In one or more embodiments of the invention, the triggering controller 120 is a collection of a plurality of device controllers.

Figure 7:
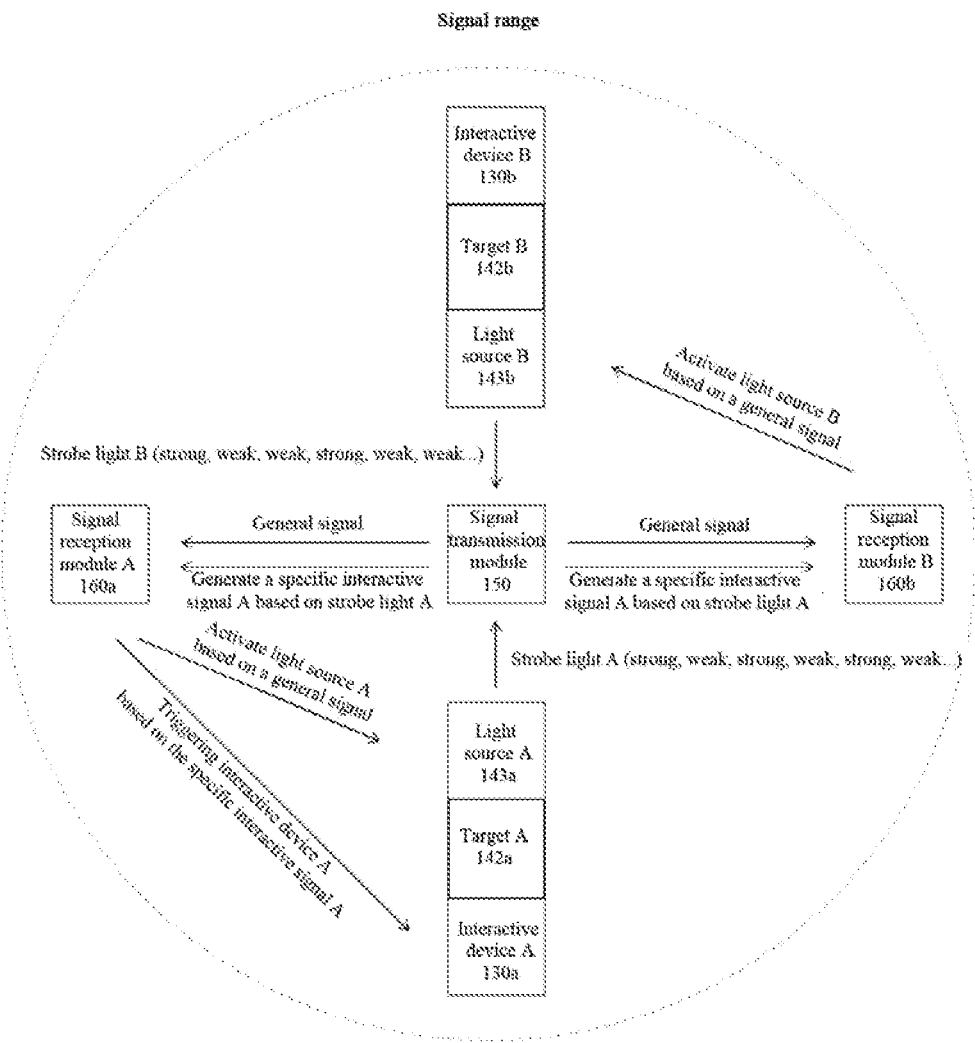
FIG. 7 shows an example schematic diagram of directional interaction according to one or more embodiments of the invention.

As shown in FIG. 2.3, the light source 143, the signal reception module (not shown in the figure) and the interactive device 130 are arranged in a box 1431 and connected to the same main board. In addition to the above arrangement, the light source 143, the signal reception module 160 and the interactive device 130 may also be arranged separately. For example, the signal reception module 160 and the interactive device 130 are arranged in a bracelet, as long as the light source 143, the signal reception module 160 and the interactive device 130 target the same target 142 at the same time. The specific targeting manner is not limited by space. In this example, the signal transmission module 150 and the signal reception module 160 adopt Bluetooth transmission. This is because the transmission distance of Bluetooth adapts to an application scenario of automatic capturing. Similarly, wireless transmissions such as Wi-Fi and ZigBee may also be selected. A matching transmission mode may be used according to the size of a scenario, such as RFID and NFC transmission in small scenarios. The signal transmission module continuously broadcasts a general signal within its broadcasting range, and the general signal enables all signal reception modules to respond after receiving. When a signal reception module enters the broadcasting range, the signal reception module receives the general signal and activates the light source 143 through the main board. The broadcasting range is preferably included in the field of view 141 of the camera lens 111, so that when the light source 143 is activated, its strobe light can be captured by the camera device 110 to detect the position of the light source 143 in the field of view 141 and obtain a relative position between the light source 143 and the triggering region 144. The triggering controller 120 triggers according to the positional relationship and the local light change pattern of the strobe light, to generate a specific interactive signal, which is broadcast by the signal transmission module. The specific interactive signal is issued for the signal reception module corresponding to a light source that emits a specific local light change. Specifically, as shown in FIG. 7, the light source A 143a and the signal reception module A 160a are directed to the same target A 142a, and the light source B 143b and the signal reception module B 160b are directed to the same target B 142b, wherein the light source A 143a emits a specific local light change of "strong, weak, strong, weak, strong, weak . . . ", and the light source B 143b emits a specific local light change of "strong, weak, weak, strong, weak, weak . . . ". The signal reception module A 160*a* and the signal reception module B 160*b* also have a specific code, for example, the signal reception module A 160*a* is coded as "00000001", and the signal reception module B 160*b* is coded as "00000010". When the light source A 143*a* appears in the field of view 141, the camera device 110 and/or the triggering controller 120 sends, to the signal reception module A 160*a*, a specific interactive signal A related to the positional relationship of the light source A 143*a*, the specific interactive signal A including an identification code "00000001". When the signal reception module A 160*a* receives the specific interactive signal A, it gives a response due to the matching of the identification code and its code. On the contrary, even if the signal reception module B 160*b* is also in the broadcasting range, when the signal reception module B 160*b* receives the specific interactive signal A, it does not give any response.

After the specific interactive signal is received by the corresponding signal reception module, the interactive device 130 is triggered to operate by the main board. In one or more embodiments, the action of the interactive device 130 helps the target to complete next triggering. In this embodiment, the interactive device 130 includes a speaker, and a resource library is preset on the main board such that different resources are called according to different specific interactive signals to triggering the speaker to carry out different actions. For example, the speaker issues a prompt about a positional relationship to guide the target 142 to move the light source 143 to a certain position in the field of view 141. For example, the triggering region 144 is disposed at a middle position of the field of view 141 in this embodiment. When the light source 143 is located at the lower left of the field of view 141 outside the triggering region 144, the triggering controller 120 controls the interactive device through a signal to issue a prompt of moving away from the camera device and toward the center line of the camera device. When the light source 143 is located in the triggering region 144, the triggering controller 120 controls the interactive device 130 through a signal to issue a prompt that the light source 143 is within the capturing range, and then the triggering controller 120 controls the camera device to capture after a preset time (for example, 3 seconds). After the capturing is completed, the triggering controller 120 controls the interactive device 130 through a signal to issue a prompt of leaving the capturing range. In the case where a plurality of targets needs to be captured, the above-mentioned interaction can also meet the requirement of capturing the plurality of targets in turn. For example, a target C carrying a light source C and a target D carrying a light source D need to enter the triggering region 144 to complete capturing, and only one target can be captured at the same time. The target C first enters a broadcasting range to activate the light source C, and the triggering controller 120 controls the interactive device through a signal to guide the target C such that the light source C enters the triggering region 144. Meanwhile, the target D also enters the broadcasting range to activate the light source D, and the triggering controller 120 controls the interactive device through a signal to guide the target D to wait for capturing outside the triggering region 144. After the target C completes the capturing and carries the light source C to leave the triggering region 144, the triggering controller 120 controls the interactive device through a signal to guide the target D such that the light source D enters the triggering region 144, to complete alternate capturing of the target C and the target D. In other embodiments, the interactive device may be an independent movable device, such as an unmanned aerial vehicle or an unmanned vehicle, or a combination of a plurality of devices, such as light coordinated with vibration.

In another embodiment, the interactive signal for an interactive device in a public region interacts with different targets at different times through a set of signal receiving modules and interactive devices, and the interaction is directed to a specific target. For example, the interactive device is an audio sound disposed in a scenario. At time E, the target E attached to the light source E satisfies the triggering condition, and the sound guides the target E such that the light source E moves to E in the field of view. At time F, the target F attached to the light source F satisfies the triggering condition, and the sound guides the target F such that the light source F moves to F in the field of view.

EXAMPLE 3

On the basis of Example 2, the light change pattern generated by strobe light emitted by the light source 143 represents coded digit data, for example, a light intensity change and/or a light wavelength change associated with a changing repetition rate. The light intensity change and/or the light wavelength change associated with the repetition rate define a target identification code. The target identification code may include a header and a subsequent digit pattern, and the header and the subsequent digit pattern may be reproduced in the light change pattern. The target identification code of each light source in the scenario 140 is different, and the triggering controller 120 can identify whether the strobe light is emitted by the light source or which of the light sources, which is then used to identify the target attached to the light source.

The light change pattern depicted in FIG. 4.2 may be extended along the time point and image sequence in the direction of a time axis to define the target identification code. For example, in FIG. 4.2, different time scales show a target identification code A 402*a* and a target identification code B 402*b* in the light change pattern. In one or more embodiments, the light intensity level and/or wavelength value in each image define digit data bits. In other embodiments, the light intensity level and/or wavelength value are unchanged along each of a plurality of reproduced image sets, and each image set corresponds to a digit data bit. That is, a digit data bit may correspond to an image or an image set. In each of the object identification code A 402*a* and the object identification code B 402*b*, a header 401 and a trailer 403 define a distinctive digit data bit pattern. For example, the header 401 and the trailer 403 may each include eight consecutive "0" digit data bits. Interposed between the header 401 and the trailer 403 are: the target identification code A 402*a* including a digit data bit pattern of "1010101010101010", and the target identification code B 402*b* including the digit data bit pattern of "1010010101011010". Correspondingly, the digit data bit pattern of "1010101010101010" and the digit data bit pattern of "1010010101011010" are used to identify or select two distinctive light sources attached to two distinctive targets in the scenario 140.

The process of this example in one or more embodiments of the invention is specifically implemented as follows:

In step S101, a light source is activated based on a scenario or a signal of a target. In this step, a signal transmission module continuously broadcasts a general signal within its broadcasting range. The general signal enables all signal reception modules to respond after receiving. When a signal reception module enters the broadcasting range, the signal reception module receives the general signal and activates a light source. In one or more embodiments of the invention, the light source is activated based on a signal of a target, for example, the target activates the light source through voice or physical input. In one or more embodiments of the invention, the light source is attached to the target in the scenario. In one or more embodiments, the light source emits strobe light, the intensity and/or color of which change with time. In one or more embodiments, the light source emits strobe light in a light change pattern with a lower repetition rate (for example, 10 Hz, 20 Hz, etc.) than a frame rate of a camera device. In one or more embodiments, the light source emits strobe light that is synchronous with the frame rate of the camera device. For example, the strobe light may be activated and/or synchronized based on a triggering signal sent from a triggering controller and/or a camera device. In one or more embodiments, the changes in the intensity and/or wavelength of the strobe light have an associated repetition rate to define the target identification code.

In step S102, an image sequence of the scenario is captured by a camera device. Specifically, the target is located within the field of view (FOV) of the camera lens and appears in the image sequence. For example, the image sequence may include a burst of static images or may be a part of a burst of static images. In another example, the image sequence may include a video or be a part of a video. In one or more embodiments of the invention, the image sequence of the scenario is captured while the light source emits strobe light. In one or more embodiments, the frame rate of the image sequence is selected based on the duty cycle and/or repetition rate of the light source, so that coherent images (or a pair of images with a fixed interval in the image sequence) include alternating light and dark levels, and/or colors that alternate with the light source. For example, the light sources may be asynchronous, and the frame rate is selected based on the predetermined duty cycle and/or repetition rate of the asynchronous light sources. In one or more embodiments, a timer of the camera device is used to control image capture according to the selected frame rate.

In one or more embodiments, the duty cycle and/or repetition rate of the light source are selected based on the frame rate of the image sequence, so that coherent images (or a pair of images with a fixed interval in the image sequence) include alternating light and dark levels, and/or colors that alternate with the light source. For example, the frame rate may be predetermined, and the light source is synchronized with the frame rate, for example, based on a triggering signal from the camera device.

In step S103, the light source in the scenario is detected based on a local light change pattern along the image sequence. Specifically, the strobe light emitted from the light source causes a change in the light intensity and/or light color received by an optical sensor of the camera device, resulting in a local light change pattern along the image sequence. In one or more embodiments, the intensity of the strobe light is adjusted to control the size of the location of the local intensity change pattern in each image. For example, the size of the location may be limited to a percentage (e.g., 1%, 3%, etc.) of horizontal and vertical sizes of the FOV. In one or more embodiments, the position and size are defined at a position where the difference in alternating light and dark levels and/or alternating colors in coherent images identified by the optical sensor of the camera device exceeds a predetermined threshold. In one or more embodiments, this position is referred to as the position of the light source in the image.

In one or more embodiments, a pair of images in the image sequence is compared by subtracting the light intensity values and/or wavelength values of corresponding pixels. Specifically, the light intensity value and/or wavelength value are generated by the optical sensor. For example, the light intensity value may correspond to a pixel output value of a monochrome CMOS (Complementary Metal Oxide Semiconductor) sensor. In another example, the output value of an RGB CMOS sensor may be analyzed to determine the wavelength value of each pixel. Specifically, the light intensity values and/or wavelength values of pixels in one image are subtracted from the light intensity values and/or wavelength values of corresponding pixels in another image to generate differences. Pixels with alternating light level and dark level differences and/or alternating wavelength differences in the differences are selected as a part of the position of the light source in the image. Depending on the ratio of the duty cycle/repetition rate of the light source to the frame rate of the image sequence, the pair of images may be coherent images or two images separated by a specific number of images (such as every three images).

In one or more embodiments, when the light source in the scenario is detected, a motion parameter is introduced, and motion prediction is carried out according to the time difference of imaging between different images and in combination with the motion parameter, that is, the position of a point at next moment is calculated according to the motion parameter.

In one or more embodiments, the target identification code is extracted from the local light change pattern to identify the light source from a plurality of light sources in the scenario. In one or more embodiments, the local light change pattern is analyzed to detect a predetermined header pattern. Once detected, the pattern following the predetermined header pattern is extracted as a distinguishing code for identifying a specific light source or target. In one or more embodiments, the distinguishing code has a predetermined length or number of digit bits for defining the target identification code. In other embodiments, the target identification code may be defined based on other criteria.

In step S104, the position of the light source in a field of view at at least one moment is determined based on the light source detected in step S103. Specifically, the field of view is selected from an image captured by at least one camera lens at a certain moment or a certain time period, then a position of the light source in the image at the current moment or one or a few moments before is obtained, and the position of the light source in the field of view at a required moment can be obtained or derived according to the proportional positional relationship between the image and the field of view where the light source is located. In one or more embodiments of the invention, a capturing lens image of a capturing lens at the current moment is regarded as the field of view, and a position of the light source in the infrared lens image of an infrared lens at the current moment is mapped to the capturing lens image as the position of the light source in the field of view.

In step S105, according to the positional relationship between the light source and the triggering region in the field of view at at least one moment, the triggering action is initiated at least when the positional relationship satisfies a triggering condition. The triggering region is a part of or all of the field of view. The triggering region may be one or more. A plurality of triggering regions may be connected to each other in the field of view or spaced at different positions in the field of view. The triggering region may also be at different positions in the field of view over time. When the triggering controller detects that the position of the light source satisfies the triggering condition, such as when the light source is located in the triggering region, or when a specific number of light sources are located in different triggering regions, or when the light source is located somewhere outside the triggering region, the triggering controller initiates a corresponding triggering action according to the positional relationship between the light source and the triggering region. The triggering action further includes, according to the positions of the light source and the triggering region and the local light change pattern, generating an interactive signal and broadcasting the same through the signal transmission module. After the interactive signal is received by the signal reception module, the interactive signal enables interaction between the target and the interactive device. The interactive signal may be a specific interactive signal, and the specific interactive signal only enables the signal reception module corresponding to the light source having a specific local light change to respond. In other embodiments, in addition to the positional relationship between the light source and the triggering region, the triggering condition may also be combined with other conditions, such as a condition that the target completes a specified action in the triggering region or the light source completes a specific trajectory movement in the triggering region.

EXAMPLE 4

On the basis of Example 3, in one or more embodiments of the invention, this example may further provide feedback of the triggering result. For example, when the target is a user or an object controlled by the user, the user may receive feedback on the capturing result related to the target. As shown in FIG. 1.3, one or more embodiments of the invention further include a server 170 and an output device 180. The server 170 is connected to the camera device 110 and the output device 180 respectively. The output device 180 is associated with the light source 143 with a specific target identification code. For example, when the output device 180 is the user's smartphone, the server 170 is preset with light source IDs of light sources with different target identification codes. The smartphone accesses the server 170 through a Quick Response (QR) code set outside the box 1431. The QR code includes light source ID information. When accessing the server 170, the user authorizes the server 170 to read his smartphone ID, to associate the smartphone with the light source 143. When the camera device 110 completes the capturing of the target 142 carrying the corresponding light source 143, the camera device 110 may transmit the capturing result to the smartphone of the corresponding user through the server 170. In one or more embodiments, the output device 180 is an audio-visual player (e.g., an outdoor screen, an electronic album, etc.), and the audio-visual player is provided with a reading device for reading information on the box 1431 or the light source 143 or the signal reception module 160. The specific reading device (e.g., a camera device, an RFID device, etc.) may be configured according to different read information. When the camera device 110 completes the capturing of the target 142 carrying the corresponding light source 143, the camera device 110 transmits the capturing result and the information related to the ID of the light source to the audio-visual player for storage, the information being any one or more of the information on the box 1431 or the light source 143 or the signal reception module 160. When the audio-visual player reads the any one or more of the information on the box 1431 or the light source 143 or the signal reception module 160, the audio-visual player displays the corresponding capturing result. The foregoing embodiment can implement one-to-one correspondence between the user and the capturing result when the server 170 does not read the user's personal information (such as the user's facial feature information).

Figure 8:
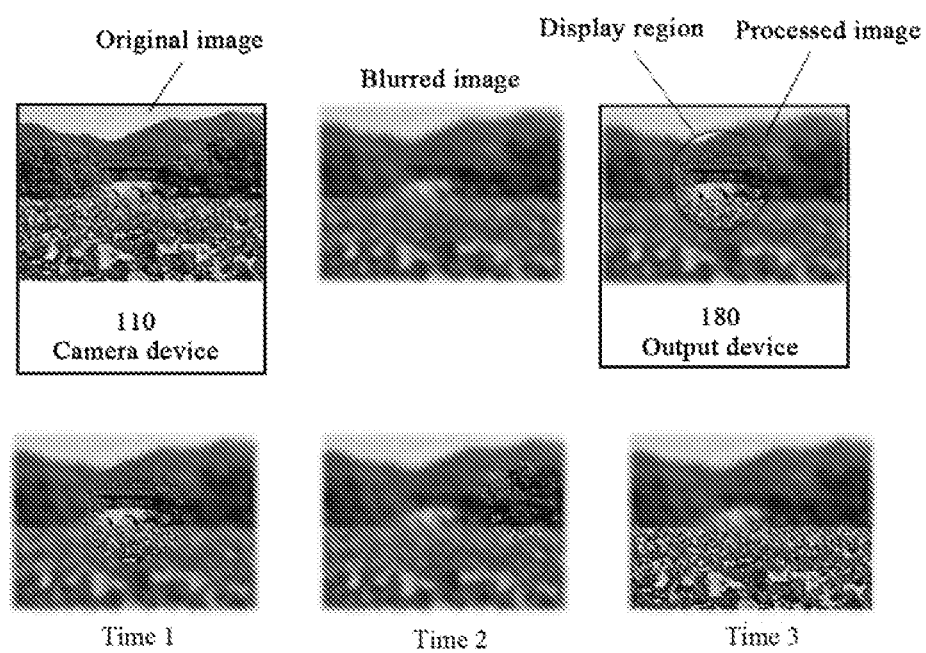
FIG. 8 shows an example schematic diagram of image processing according to one or more embodiments of the invention.

Further, as shown in FIG. 8, when receiving the capturing result, the server stores the capturing result image as an original image, and the server or the output device 180 processes the capturing result image and then stores the same as a processed image. When the user needs to display the corresponding capturing result on the output device 180, the server or the output device 180 displays the original image or the processed image on the output device 180 according to the user's operation. The image processing steps in one or more embodiments of the invention are:

Step S801: perform algorithmic processing on the original image to form a blurred image. This algorithmic processing may use the existing mean blur, Gaussian blur or mosaic algorithm, etc.;

Step S802: map positions of pixels on the processed blurred image and the original image;

Step S803: use a part of a pixel set within the image range as a display region;

Step S804: display the original image within the display region, and displays the blurred image outside the display region;

Step S805: the display region changes with condition setting, the condition setting may change over time or selected by the user, and the change of the display region may be shift or area change.

In another embodiment, steps S802 and S804 above are not performed, and between step S803 and step S805, a blurred image processed by an inverse algorithm corresponding to the algorithm of step S801 is displayed within the display region, and the previous blurred image is displayed outside the display region.

Since the user may browse the capturing result using the output device 180 in a public place, the display of the processed image can reduce the exposure of user's personal information in the public place, does not affect the user's preview of the capturing result, and can facilitate user's paid purchase in some commercial situations.

In one or more embodiments, the server further processes the capturing result image, such as adding audio and special effects.

In one or more embodiments, the image processing may be performed in real time on the server or output device. For example, an Application installed on the output device determines the display region, blurs the original image outside the display region, and directly outputs the processed original image. Whenever the display region changes, the Application performs new blur processing on the original image in real time, and outputs a new processed original image.

EXAMPLE 5

On the basis of Example 3, in one or more embodiments of the invention, this example realizes a function of tracking the capturing. As shown in FIG. 1.4, a camera device holder 190 and a tracking controller 120a are further included. The camera device 110, the tracking controller 120a, and the camera device holder 190 are communicatively connected to each other. In one or more embodiments, two or more of the camera device 110, the tracking controller 120a, and the camera device holder 190 are integrated in one device. In one or more embodiments, at least a part of the tracking controller 120a may be included in the camera device 110, or at least a part of the tracking controller 120a may be included in the camera device holder 190, or a part of the tracking controller 120a is included in the camera device 110, and the other part of the tracking controller 120a is included in the camera device holder 190. In one or more embodiments, the tracking controller 120a and the triggering controller 120 are integrated in the same controller.

In one or more embodiments, the camera device holder 190 is configured to mechanically support the camera device 110 and adjust the field of view 141 of the camera lens 111 in response to a control signal from the tracking controller 120a. For example, the camera device holder 190 may include an electric tilting and rotating device for adjusting the camera angle of the camera lens 111. In another example, the camera device holder 190 may include an electric horizontal and vertical sliding device for adjusting the position of the camera lens 111 relative to the scenario 140.

FIG. 9.1 shows a motorized camera mobile device stand 210, which mechanically supports a camera mobile device 201. In one or more embodiments, motorized camera mobile device stand 210 is a motor assembly, including a holder 221, a tilting shaft 203, a U-shaped bracket 204, a rotating shaft 209, and a stand 222. The holder 221 is configured to mechanically support the camera mobile device 201 and mechanically connected to the tilting shaft 203. The stand 222 is configured to maintain the mechanical stability of the motorized camera mobile device stand 210 while being placed on a solid surface. The U-shaped bracket 204 accommodates: a tilting motor connected to the tilting shaft 203, a rotating motor connected to the rotating shaft 209; and a communication interface configured to communicate with the camera mobile device 201 and/or the tracking controller 120a. For example, the communication interface may be based on Bluetooth, NFC, USB or other wireless/wired communication interfaces. In one or more embodiments, the rotating shaft 209 may rotate about a rotating axis 209-1 through the rotating motor in response to receiving a control signal from the tracking controller 120a via the communication interface. Similarly, the tilting shaft 203 may rotate about a tilting axis 203-1 through the tilting motor in response to receiving a control signal from the tracking controller 120a via the communication interface. In response to the tilting of the holder 221 about the tilting axis 203-1 and/or the rotation of the holder 221 together with the tilting shaft 203 and the U-shaped bracket 204 about the rotating axis 209-1, the orientation of the camera lens 220 can be adjusted. Correspondingly, the field of view 220-1 of the camera moving device 201 is adjusted according to the orientation of the camera lens 220.

FIG. 9.2 shows a camera mobile device handle grip 800, which mechanically supports the camera mobile device 201. In one or more embodiments, the camera mobile device handle grip 800 is a motor assembly, including a holder 221, a tilting shaft 203, a tilting motor 213, a rotating shaft 209, a rotating motor 219, and a handle grip 222. The holder 221 is configured to mechanically support the camera mobile device 201 and mechanically connected to the tilting shaft 203. The handle grip 222 is configured to maintain the mechanical stability of the camera mobile device handle grip 800 while being held by an observer. The handle grip 222 includes a communication interface configured to communicate with the camera mobile device 201 and/or the tracking controller 120a. For example, the communication interface may be based on Bluetooth, NFC, USB or other wireless/wired communication interfaces. In one or more embodiments, the rotating shaft 209 may rotate about a rotating axis 209-1 through the rotating motor 219 in response to receiving a control signal from the tracking controller 120a via the communication interface. Similarly, the tilting shaft 203 may rotate about a tilting axis 203-1 through the tilting motor 213 in response to receiving a control signal from the tracking controller 120a via the communication interface. In response to the tilting of the holder 221 about the tilting axis 203-1 and/or the rotation of the holder 221 together with the tilting shaft 203 and the tilting motor 213 about the rotating axis 209-1, the orientation of the camera mobile device 201 can be adjusted. Correspondingly, the field of view 220-1 of the camera mobile device 201 is adjusted according to the orientation of the camera lens 220.

In one or more embodiments of the invention, the specific tracking steps are:

Through steps S101 to S104 in Example 3, the position of the light source in the field of view at at least one moment is determined.

In step S305, compare the position of the light source in the field of view at at least one moment with a target position to generate a result. In one or more embodiments, the result includes a displacement from the position to the target position. In one or more embodiments, the displacement may vary from image to image in continuous images, which indicates that the object is a moving object.

In step S306, generate a control signal based on the result, for orienting the camera device. In one or more embodiments, the control signal is configured to adjust the orientation of the camera lens to a direction opposite to the displacement. For example, if the displacement indicates that the target position is on the right of the light source in the image, the control signal is to adjust the orientation of the camera lens to the left. In one or more embodiments, the control signal is configured to adjust the relative position of the camera with respect to the scenario to a direction opposite to the displacement. For example, if the displacement indicates that the target position is on the right of the light source in the image, the control signal is to adjust the relative position of the camera to the left. In one or more embodiments, the relationship between the movement parameter of the light source and the displacement causes fine adjustment of the adjustment amount of the control signal.

When the camera device is oriented, the content of the scenario 140 displayed in the field of view 141 changes. In one or more embodiments, the triggering region 144 is set based on a fixed object in the scenario 140, so when the camera device is oriented, the position of the triggering region 144 in the field of view 141 also changes. This change may be determined based on the displacement attributes (such as angle and speed) of the camera device during orientation, or based on image identification technology such that the triggering region 144 is always aligned on the fixed object.

In one or more embodiments, the number of camera devices is more than one to form camera device groups. The same camera device group serves the same target 142. Specifically, the camera devices in the same camera device group all capture the same target 142. Further, the camera devices in the same camera device group have a linkage relationship with each other. In one or more embodiments, the linkage relationship may be: a point or a region (such as a center point of the field of view) in the field of view 141 of all camera devices aims at a point or a region on the target (such as the light source attached to the target), and the tracking controller 120a controls all camera devices in the camera device group, so that the target positions of all camera devices are set to the corresponding point or the corresponding region in the field of view 141 (such as the center point of the field of view). In one or more embodiments, the linkage relationship may also be: an active camera device is set, and according to the position attributes (such as distance and angle) between the active camera device and other camera devices, when the active camera device starts to be oriented, the displacement attributes of other camera devices are determined according to the position attributes and the displacement attribute of the active camera device during orientation. The above linkage relationships can all realize the capturing of the same point or the same region from different angles. In one or more embodiments, in other linkage relationships, different camera devices may aim at different points or different regions on the target. Through the linked camera device groups, multiple angles of capturing images can be obtained. Further, whether different camera devices satisfy the triggering condition can form a logical relationship (such as AND, OR, and NOT), thereby achieving more complex or precise triggering condition determination.

EXAMPLE 6

On the basis of Example 3, in one or more embodiments of the invention, the triggering condition of this example is determined according to the positional relationship between the light source and the triggering region in combination with image identification for the target. During image identification, an algorithm such as CNN (Convolutional Neural Networks) or ORB (Oriented Fast and Rotated Brief) may be used to obtain an eigenvalue vector. When the spatial distance between the eigenvalue vector and the eigenvalue vector of the set target is less than a threshold, it is determined to be true. In one or more embodiments, a region-of-interest to be analyzed is determined by acquiring a dynamic model of the target and the position of the light source in the PCT international publication document WO2020/142892 to reduce computing resources required in the image identification and improve the identification accuracy. In one or more embodiments of the invention, the process may be: in step S401, capture an image sequence of a scenario by the camera device, the scenario including a light source connected to a first part of the target; in step S402, detect the light source in the scenario by a hardware processor based on a local light change pattern in the image sequence; in step S403, determine the position of the light source in at least one image of the image sequence by the hardware processor; in step S404, generate a region-of-interest for analyzing the target by the hardware processor based on the position of the light source and the dynamic model of the target; in step S405, generate an analysis result of the target based on the region-of-interest; and in step S406, execute a predetermined task based on the analysis result, such as a face recognition algorithm, a gesture recognition algorithm or other algorithm. In one or more embodiments, the light source is disposed in a box, the box is provided with a sling, and the target is a user. The user can place the light source in front of his trunk through the sling to trigger, during image identification, the controller or other hardware processor to determine the position of an image feature value determination part (such as facial feature or gesture action) in the user through the position of the light source in the image and the dynamic model of the target. In another embodiment, the light source is disposed in a bracelet, and the light source is installed on the wrist or ankle of the user through the bracelet.

When the triggering condition is determined, the result of the algorithm for performing the predetermined task and the positional relationship between the light source and the triggering region also need to be determined. For example, the triggering condition is set as the light source is within the triggering region and the result of the gesture recognition algorithm is an action of putting out the thumb, or the triggering condition is set as the light source is outside the triggering region and the result of the face recognition algorithm is a laughing expression.

In one or more embodiments, capturing is carried out in a process similar to a movie script, and the triggering condition changes according to the preset movie script. For example, in a first triggering condition, the light source G of the target G and the light source H of the target H are required to be in different triggering regions on two sides of the field of view. When the triggering controller determines that the first triggering condition is satisfied, perform the first triggering action (such as capturing or starting to capture). Then a second triggering condition is activated, which requires the light source G and the light source H to move along a predetermined trajectory and be in the same triggering region at the middle part of the field of view. When the triggering controller determines that the second triggering condition is satisfied, perform the second triggering action. Next, a third triggering condition is activated, which requires the light source G and the light source H to be in the same triggering region at the middle part of the field of view, while the target G and the target H complete a specified action (such as hugging), and then perform the third triggering action (such as ending capturing). In one or more embodiments, while the above triggering actions are performed, the interactive device may also accurately interact with the target, for example, the speaker informs each target of next triggering condition. In one or more embodiments, the triggering controller or other hardware processor replaces the background in the field of view according to the preset movie script. The preset movie script in the above embodiment may be acquired by the triggering controller or other hardware processor by being saved in a memory of the camera device, or may be transferred to the controller or other hardware processor by being saved in a server. One or more movie scripts are preset, and the user selects or modifies the preset movie scripts through the camera device or a client connected to the server. In one or more embodiments, the movie script includes an image cropping template. Through the image cropping template, the selected target in the field of view can be individually cropped into an independent image that is a part of the field of view, that is, the independent image includes only the selected target, and the target that is not selected but appears in the field of view and the background are discarded after cropping.

In one or more embodiments, the position(s) of the camera device and/or the target are adjusted according to light field conditions in the PCT international publication document WO2020/140210, so that the captured image is more in line with the capturing requirements of the movie script. In one or more embodiments of the invention, the process may be: in step S501, generate visible light in one direction at a position in the scenario; in step S502, analyze the movie script to determine image acquisition standards of movie images; in step S503, generate a target camera position and/or a target object position based on the light direction and the image acquisition standards; in step S504, orient the camera device and/or the target to the target camera position and/or the target object position according to the image acquisition standards; in step S505, check the image acquisition standards; and in step S506, transmit an instruction to the camera device at the target camera position, so that the camera device captures an image of the target at the target object position.

EXAMPLE 7

Figure 10:
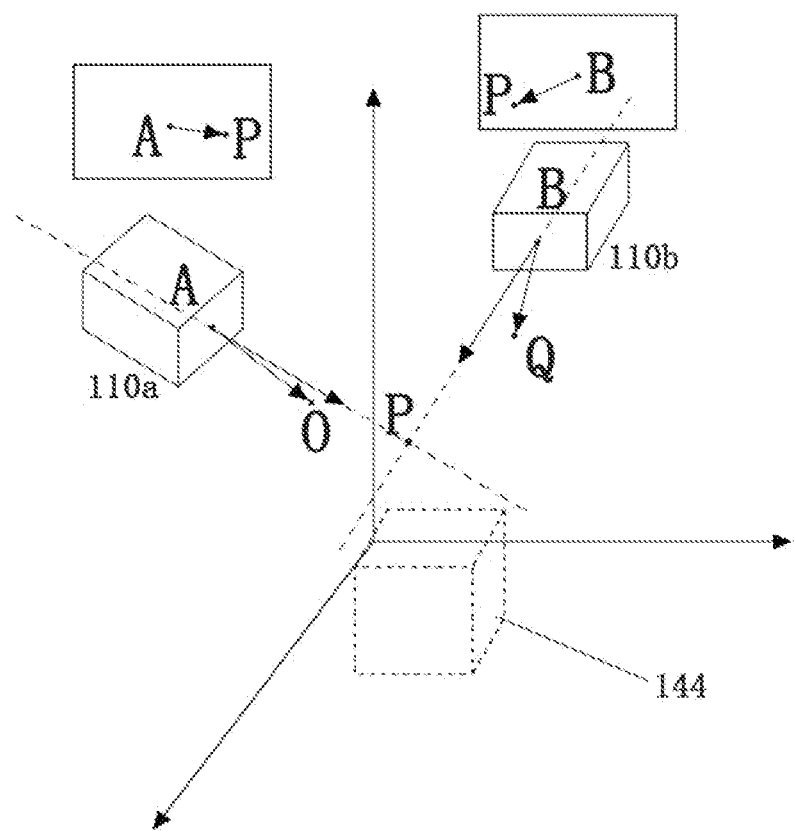
FIG. 10 shows an example schematic diagram of spatial positioning according to one or more embodiments of the invention.

In one or more embodiments of the invention, this example is an application of spatial positioning in a scenario. As shown in FIG. 10, the system 100 includes two camera devices (camera device A and camera device B) with camera lenses 111, a triggering controller 120, a scenario 140, a field of view 141 of the camera lenses 111, a target 142 in the scenario, and a light source 143 attached to the target. The light source 143 may be captured by the camera devices. The camera device A 110a and the camera device B 110b are disposed based on preset positions and capturing directions, so that at least a part of mirror images captured by the two are overlapped. The triggering controller 120 communicates with the two camera devices. The field of view 141 is a spatial range of the overlapped images captured by the two camera lenses 111. In one or more embodiments of the invention, the setting and detection of the light source 143 may be the same as that in Example 1 and/or Example 3. After the detection of the light source 143 is completed, a spatial position of the target is determined by triangulation, that is, coordinates of point P of the light source are determined. A vector $\overrightarrow{AO}$ of point A to a focal point O of the camera device A 110a where the focal point O is vertically projected to an image surface is added to a vertical projection vector $\overrightarrow{AP}$ of point A to point P to obtain that point P is located on a straight line where $\overrightarrow{AO}+\overrightarrow{AP}$ is located; a vector $\overrightarrow{BQ}$ of point B to a focal point Q of the camera device B 110b where the focal point Q is vertically projected to an image surface is added to a vertical projection vector $\overrightarrow{BP}$ of point B to point P to obtain that point P is located on a straight line where $\overrightarrow{BQ}+\overrightarrow{BP}$ is located; and the spatial position of P is on an intersection of the straight line where $\overrightarrow{AO}+\overrightarrow{AP}$ is located and the straight line where $\overrightarrow{BQ}+\overrightarrow{BP}$ is located. The triggering region 144 is a part or all of the spatial range in the scenario, and the triggering condition is determined according to the positional relationship between the light source and the triggering region. In one or more embodiments, the settings of the triggering region and the triggering condition may be the same as those in Example 1 to Example 6.

In one or more embodiments, the above-mentioned spatial positioning combined with the solutions of Examples 1 to 6 is applied in a museum where a visitor carries a light source in the scenario. When the triggering controller detects that the triggering condition is satisfied, for example, the visitor is in front of a certain collection, the triggering controller controls the speaker to emit a voice introduction for the collection. Further, the triggering controller may be connected to a holographic projection device, and a three-dimensional image of the collection is projected in front of the visitor by the holographic projection device. Furthermore, in one or more embodiments, the setting of the triggering region is matched with 3D image coordinates of the collection, so that the visitor can further interact with the 3D image. For example, when the visitor touches the 3D image, the holographic projection device changes its projection content.

In one or more embodiments, the above-mentioned spatial positioning combined with the solutions of Examples 1 to 6 is applied in a real game. A game script is preset in the system. When a player carries a light source in the scenario, the triggering condition implements triggering or changes according to the preset game script. For example, when the player carries a game paddle with a light source and swings the game paddle, the triggering controller determines the triggering condition according to the movement trajectory of the light source and the positional relationship between the light source and the triggering region for different triggering, such as triggering an unmanned aerial vehicle or an unmanned vehicle to move, or changing the game script. Further, the triggering controller may be connected to a holographic projection device, and a 3D image is projected around the player through the holographic projection device. The setting of the triggering region is matched with 3D image coordinates, so that the player can further interact with the 3D image. For example, when the player's light source is located on the coordinates of the 3D image, the holographic projection device changes its projection content.

In one or more embodiments, the above-mentioned spatial positioning combined with the solutions of Examples 1 to 6 is applied in intelligent services. In one embodiment, a user carries a light source in the scenario, and when the triggering controller detects that the triggering condition is satisfied, for example, when the user makes a preset action or gesture, the triggering controller controls electrical equipment to operate. Further, the triggering controller or other hardware processor analyzes the movement trajectory and speed of the light source, to predict the location of the user at a certain moment, so that an unmanned aerial vehicle or unmanned vehicle can be at the location of the user at that moment to provide services to the user.

The content in the above one or more embodiments can also be implemented by the solutions of Example 1 to Example 6 respectively, but a more complex or higher-precision triggering can be implemented in combination with the spatial positioning.

EXAMPLE 8

In one or more embodiments of the invention, triggering is implemented only by image identification without using a light source. That is, eigenvalues of different targets are determined by an image identification algorithm. After the eigenvalues of the targets are determined, positions of the targets in the field of view are determined based on the eigenvalues and image identification, and triggering and interaction are implemented based on the positional relationship between the positions of the targets in the field of view and the triggering regions. In one or more embodiments, the triggering and interaction may be implemented as described in Examples 1 to 7.

Figure 11A:
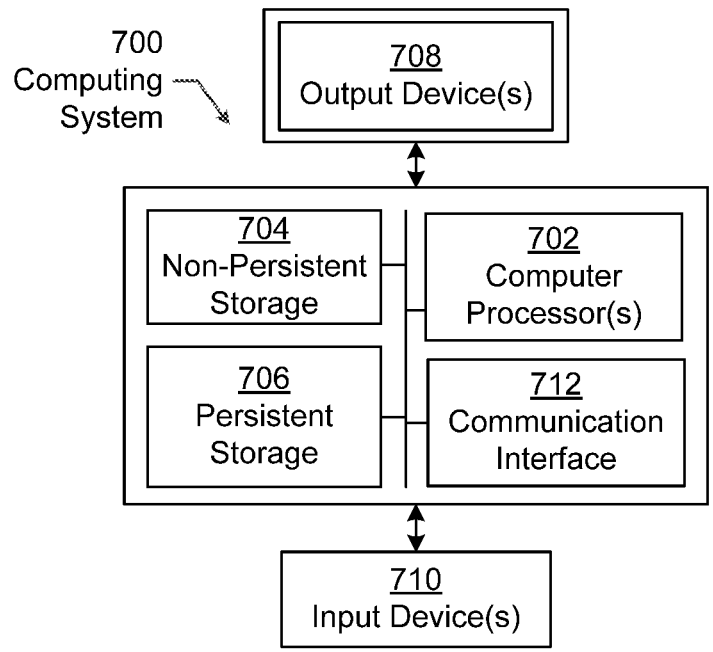
FIGS. 11A and 11B shows a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 11A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 11B:
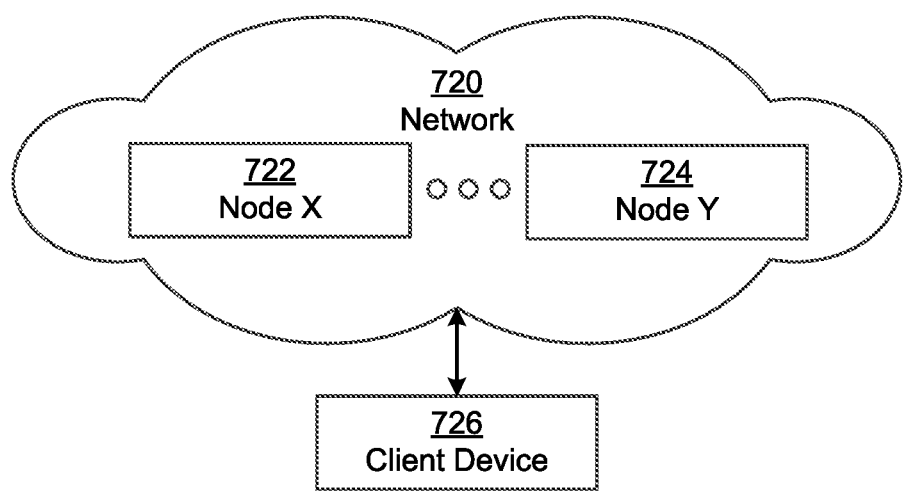

The computing system (700) in FIG. 11A may be connected to or be a part of a network. For example, as shown in FIG. 11B, the network (720) may include multiple nodes (e.g., node X (722), node Y (724)). Each node may correspond to a computing system, such as the computing system shown in FIG. 11A, or a group of nodes combined may correspond to the computing system shown in FIG. 11A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 11B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 11A. Further, the client device (726) may include and/or perform all or a portion of one or more embodiments of the invention.

The computing system or group of computing systems described in FIGS. 11A and 11B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 11A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 11A and the nodes and/or client device in FIG. 11B. Other functions may be performed using one or more embodiments of the invention.

While the invention has been described with respect to a limited number of embodiments and examples, those skilled in the art, having benefit of this disclosure, will appreciate that other embodiments or examples can be devised which do not depart from the scope of the invention as disclosed herein. Accordingly, the scope of the invention should be limited only by the attached claims.

What is claimed is:

1. A method for scenario triggering and interaction based on target positioning, comprising:
　　capturing, using a first camera device, a first sequence of images of a scene;
　　determining, based on a pre-determined criterion, a first location of a target object in at least a first image of the first sequence of images;
　　generating, based on a first orientation of the first camera device and the first location of the target object in the first image, a first target object vector from a first camera position of the first camera device to the target object in the scene;

identifying a second target object vector from a reference position in the scene to the target object in the scene;

determining, by at least computing an intersection between the first target object vector and the second target object vector, a target object position of the target object in the scene;

comparing the target object position and a task triggering region in the scene to generate a comparison result; and performing, based on the comparison result, a pre-determined task associated with the task triggering region.

2. The method of claim 1, wherein the target object corresponds to a human user, and wherein performing the pre-determined task comprises presenting, to the human user, a pre-determined content associated with the task triggering region.

3. The method of claim 2, wherein the pre-determined content comprises augmented reality content, and wherein presenting the pre-determined content allows the human user to interact with the augmented reality content around the task triggering region.

4. The method of claim 2, further comprising:

detecting, in the first sequence of images, a pre-determined gesture of the human user, wherein performing the pre-determined task associated with the task triggering region is further based on detecting the pre-determined gesture.

5. The method of claim 1, further comprising:

determining, based on the first location of the target object in the first image, a first offset angle between the first target object vector and an optical axis of the first camera device, wherein the first target object vector is generated by applying the first offset angle to the optical axis of the first camera device.

6. The method of claim 1, wherein the reference position corresponds to a second camera position of a second camera device in the scene, and wherein identifying the second target object vector comprises:

capturing, using the second camera device, a second sequence of images of the scene;

determining, based on the pre-determined criterion, a second location of the target object in a second image of the second sequence of images; and generating, based on a second orientation of the second camera device and the second location of the target object in the second image, the second target object vector from the second camera position of the second camera device to the target object in the scene.

7. The method of claim 1, further comprising:

detecting, based on a first pattern of local light change across the first sequence of images, a light source attached to the target object in the scene;

wherein the first location of the target object in the first image is determined based at least on detecting the light source.

8. A triggering controller for scenario triggering and interaction based on target positioning, comprising:

a computer processor; and memory storing instructions, when executed, causing the computer processor to:

determine, based on a pre-determined criterion, a first location of a target object in at least a first image of a first sequence of images of a scene, wherein the first sequence of images is captured using a first camera device;

generate, based on a first orientation of the first camera device and the first location of the target object in the first image, a first target object vector from a first camera position of the first camera device to the target object in the scene;

identify a second target object vector from a reference position in the scene to the target object in the scene;

determine, by at least computing an intersection between the first target object vector and the second target object vector, a target object position of the target object in the scene; and compare the target object position and a task triggering region in the scene to generate a comparison result, wherein a pre-determined task associated with the task triggering region is performed based on the comparison result.

9. The triggering controller of claim 8, the instructions, when executed, further causing the computer processor to:

wherein the target object corresponds to a human user, and wherein performing the pre-determined task comprises presenting, to the human user, a pre-determined content associated with the task triggering region.

10. The triggering controller of claim 9, wherein the pre-determined content comprises augmented reality content, and wherein presenting the pre-determined content allows the human user to interact with the augmented reality content around the task triggering region.

11. The triggering controller of claim 9, the instructions, when executed, further causing the computer processor to:

detect, in the first sequence of images, a pre-determined gesture of the human user, wherein performing the pre-determined task associated with the task triggering region is further based on detecting the pre-determined gesture.

12. The triggering controller of claim 8, the instructions, when executed, further causing the computer processor to:

determine, based on the first location of the target object in the first image, a first offset angle between the first target object vector and an optical axis of the first camera device, wherein the first target object vector is generated by applying the first offset angle to the optical axis of the first camera device.

13. The triggering controller of claim 8, wherein the reference position corresponds to a second camera position of a second camera device in the scene, and wherein identifying the second target object vector comprises:

capturing, using the second camera device, a second sequence of images of the scene;

determining, based on the pre-determined criterion, a second location of the target object in a second image of the second sequence of images; and generating, based on a second orientation of the second camera device and the second location of the target object in the second image, the second target object vector from the second camera position of the second camera device to the target object in the scene.

14. The triggering controller of claim 8, the instructions, when executed, further causing the computer processor to:
   detect, based on a first pattern of local light change across the first sequence of images, a light source attached to the target object in the scene;
   wherein the first location of the target object in the first image is determined based at least on detecting the light source.

15. A non-transitory computer readable medium storing instructions for scenario triggering and interaction based on target positioning, the instructions, when executed by a computer processor, comprising functionality for:
   capturing, using a first camera device, a first sequence of images of a scene;
   determining, based on a pre-determined criterion, a first location of a target object in at least a first image of the first sequence of images;
   generating, based on a first orientation of the first camera device and the first location of the target object in the first image, a first target object vector from a first camera position of the first camera device to the target object in the scene;
   identifying a second target object vector from a reference position in the scene to the target object in the scene;
   determining, by at least computing an intersection between the first target object vector and the second target object vector, a target object position of the target object in the scene;
   comparing the target object position and a task triggering region in the scene to generate a comparison result; and
   performing, based on the comparison result, a pre-determined task associated with the task triggering region.

16. The non-transitory computer readable medium of claim 15,
   wherein the target object corresponds to a human user, and
   wherein performing the pre-determined task comprises presenting, to the human user, a pre-determined content associated with the task triggering region.

17. The non-transitory computer readable medium of claim 16,
   wherein the pre-determined content comprises augmented reality content, and
   wherein presenting the pre-determined content allows the human user to interact with the augmented reality content around the task triggering region.

18. The non-transitory computer readable medium of claim 16, the instructions, when executed by a computer processor, further comprising functionality for:
   detecting, in the first sequence of images, a pre-determined gesture of the human user,
   wherein performing the pre-determined task associated with the task triggering region is further based on detecting the pre-determined gesture.

19. The non-transitory computer readable medium of claim 15, the instructions, when executed by a computer processor, further comprising functionality for:
   determining, based on the first location of the target object in the first image, a first offset angle between the first target object vector and an optical axis of the first camera device,
   wherein the first target object vector is generated by applying the first offset angle to the optical axis of the first camera device.

20. The non-transitory computer readable medium of claim 15,
   wherein the reference position corresponds to a second camera position of a second camera device in the scene, and
   wherein identifying the second target object vector comprises:
      capturing, using the second camera device, a second sequence of images of the scene;
      determining, based on the pre-determined criterion, a second location of the target object in a second image of the second sequence of images; and
      generating, based on a second orientation of the second camera device and the second location of the target object in the second image, the second target object vector from the second camera position of the second camera device to the target object in the scene.

* * * * *